(12) United States Patent
Narahara

(10) Patent No.: US 8,019,774 B2
(45) Date of Patent: Sep. 13, 2011

(54) INFORMATION PROCESSING APPARATUS, AND METHOD AND PROGRAM FOR SEARCHING TEXT INFORMATION CANDIDATE

(75) Inventor: Tatsuya Narahara, Kanagawa (JP)

(73) Assignee: Sony Corporation (JP)

( * ) Notice: Subject to any disclaimer, the term of this patent is extended or adjusted under 35 U.S.C. 154(b) by 606 days.

(21) Appl. No.: 12/228,425

(22) Filed: Aug. 12, 2008

(65) Prior Publication Data

US 2009/0077039 A1    Mar. 19, 2009

(30) Foreign Application Priority Data

Aug. 17, 2007 (JP) .............................. P2007-212662

(51) Int. Cl.
*G06F 7/06* (2006.01)
*G06F 17/30* (2006.01)

(52) U.S. Cl. ....................................... 707/769; 711/165

(58) Field of Classification Search ................... 707/769, 707/765; 711/165
See application file for complete search history.

(56) References Cited

FOREIGN PATENT DOCUMENTS

JP    2007-011974 A    1/2007

*Primary Examiner* — Etienne Leroux
*Assistant Examiner* — Mohammad N Rahman
(74) *Attorney, Agent, or Firm* — Lerner, David, Littenberg, Krumholz & Mentlik, LLP

(57) ABSTRACT

An information processing apparatus for searching for a target text information candidate from among text information candidates stored in order to search for and/or input target information, may include a display information generating unit for generating and displaying display information, the display information including only both a first character line of characters extending in a first direction including a character set to be selected, and a second character line of characters related to the first character line, extending in a second direction and intersecting the first character line, out of a two-dimensional matrix of rows and columns of characters arranged for selection, and a shift instruction receiving unit for receiving a shift instruction to shift from the character set to be selected.

13 Claims, 25 Drawing Sheets

FIG. 7A
FIG. 7B
FIG. 7C

⇩ ENTER

FIG. 12A    KANA "ち" SELECTED
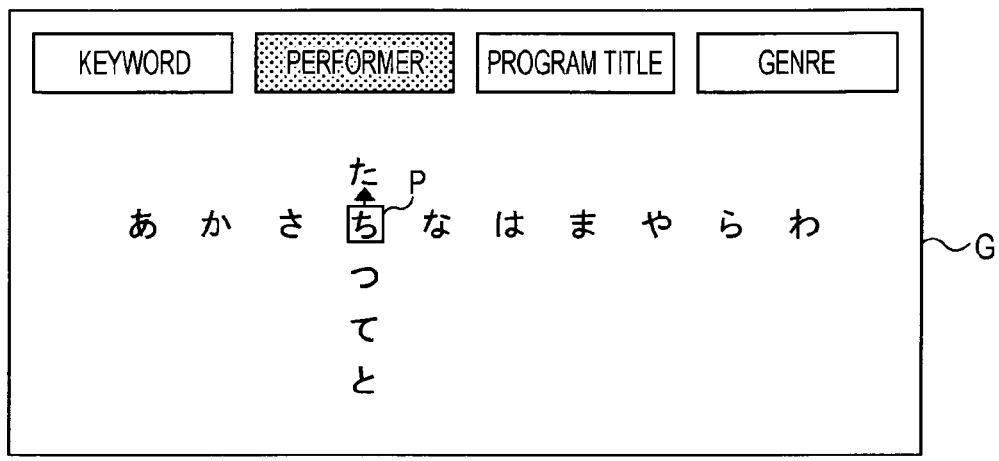
FIG. 12B    RETURNING TO KANA "た"
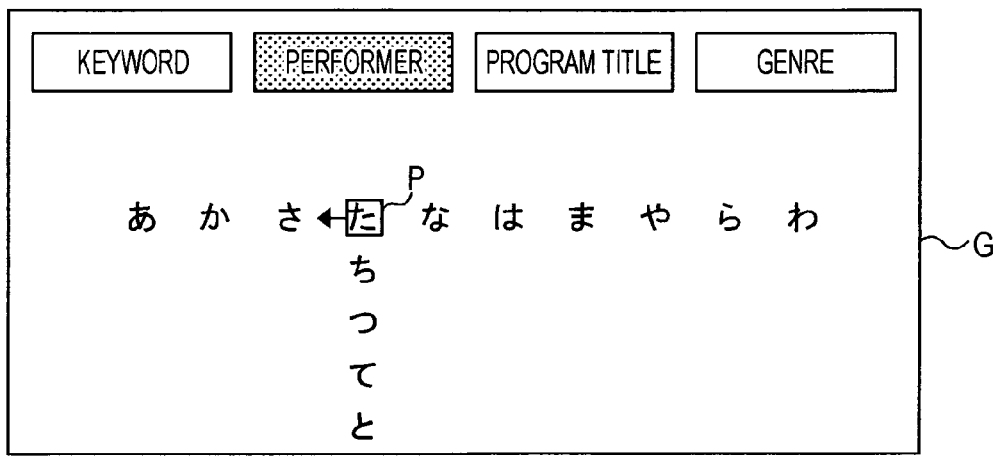
FIG. 12C    SHIFTING SELECTION POINT TO KANA "さ"
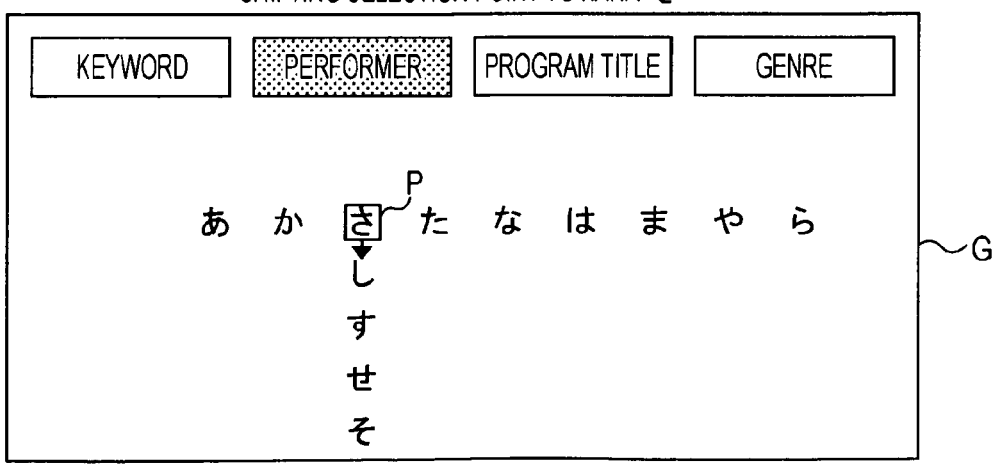

FIG. 13A  KANA "ち" SELECTED
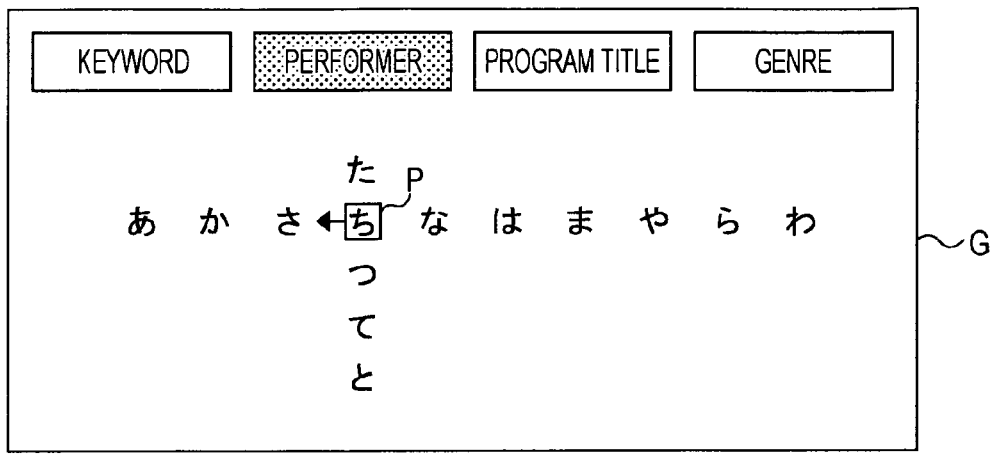
FIG. 13B  SHIFTING SELECTION POINT TO KANA "さ"
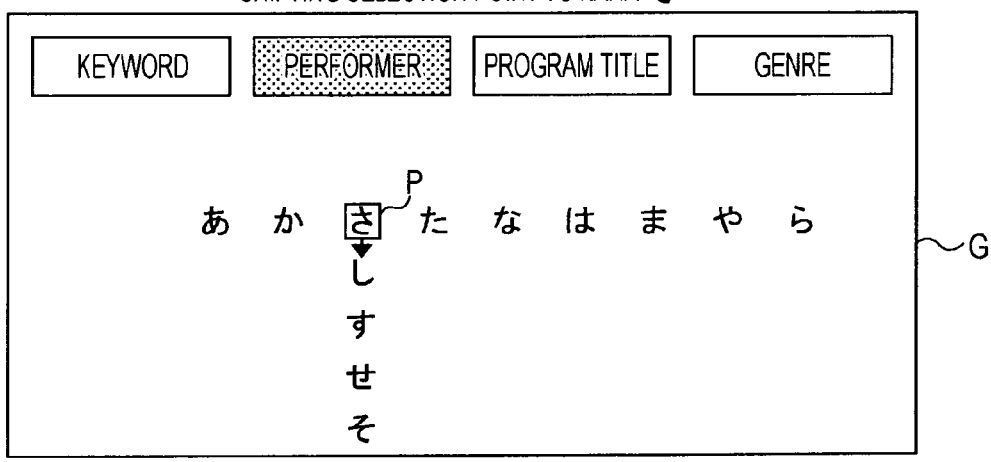
FIG. 13C  SELECTING KANA "し"
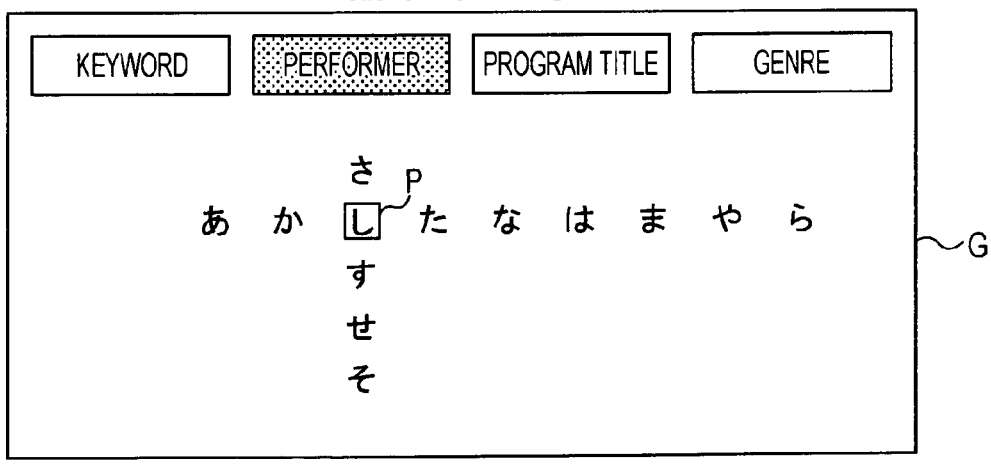

ENTER

ENTER

SORT

ENTER

ововInformation Processing Apparatus, and Method and Program for Searching Text Information Candidate

INFORMATION PROCESSING APPARATUS, AND METHOD AND PROGRAM FOR SEARCHING TEXT INFORMATION CANDIDATE

CROSS-REFERENCE TO RELATED APPLICATIONS

The present application claims priority from Japanese Patent Application No. JP 2007-212662, filed in the Japanese Patent Office on Aug. 17, 2007, the entire content of which is incorporated herein by reference.

BACKGROUND OF THE INVENTION

1. Field of the Invention

The present invention relates to a variety of apparatuses using text information, including a recording and reproducing apparatus, such as a hard disk recorder using text information like an electronic program guide (EPG), and a digital still camera receiving the text information as tag information. The present invention also relates to a method and a program for searching for and inputting the text information used in such apparatuses.

2. Description of the Related Art

Hard disk recorders are now in widespread use. The hard disk recorder receives television broadcast signals, and selects and records a desired television program onto a hard disk thereof. The hard disk recorder records the TV broadcast program with text information related to the program associated therewith. The text information is typically retrieved from the EPG. The hard disk recorder receives a keyword such as the name of a performer in a broadcast program, searches for the text information related to the program, and then searches for the desired broadcast program.

Some digital cameras and digital video cameras attach tag information, such as photograph time and date, photograph location, name of a subject, etc. to still image data of a captured image and moving image data of a captured moving image, and sort and search for the still image information and moving image information in accordance with the tag information.

When keyword information or tag information, as the text information, is input in such an apparatus, the apparatus displays, on a monitor display connected thereto, a liquid-crystal display (LCD) thereof, or the like, a software keyboard. A user of the apparatus inputs the text information through the displayed software keyboard.

A computer image of a keyboard can provide the Japanese kana syllabary or the alphabet arrangement on a display screen. Using up/down/left/right keys, the user places a cursor on a display position of a target character on the displayed software keyboard, and then performs an entry operation. The text information is thus input with one character at a time.

Japanese Unexamined Patent Application Publication No. 2007-011974 discloses a technique that allows a user to enter characters more efficiently with the software keyboard. In accordance with the disclosed technique, a line of characters can be registered, deleted, or edited on the software keyboard. In this way, the user can customize the software keyboard for ease of use.

SUMMARY OF THE INVENTION

The above-described software keyboard is useful for inputting all text information of a keyword. Since an amount of text information selectable is large, it takes a user more time to enter a target keyword. It may be desirable to enter the keyword more easily.

In the above-described hard disk recorder, information related to a name of a performer, as a keyword in a program search, is contained in the text information such as stored EPG. By extracting beforehand a selectable text information candidate, the hard disk recorder allows the user to select any one from among the candidates and use the selected program. Tag information, such as names of people and location names, used in the digital cameras, the digital video cameras and the like, may be selected from a prepared dictionary and then used.

The Japanese kana syllabary is considered as a simple method of inputting a keyword rather than using the software keyboard. In the Japanese kana syllabary, a column containing a target kana character is first specified, and the target kana character (row) is then specified. The target kana character is then input.

FIGS. 24A and 24B and 25 illustrate examples of hard disk recorders that use a search screen. Such a hard disk recorder extracts a keyword from EPG information, determines an attribute of each keyword, and then generates a keyword list on a per attribute basis. The hard disk recorder then allows a target keyword to be searched on the keyword list having a desired attribute.

As shown in FIGS. 24A and 24B and 25, selection items k1, k2, k3, and k4 listed on the top of the list are contained in the text information such as the stored EPG (electronic program guide). The selection items k1, k2, k3, and k4 are extracted as a selectable text information candidate. The attribute of each item is determined, and keywords listed under each determined attribute thus serve as a search target. The hard disk recorder is prepared to receive an instruction input for searching.

As shown in FIGS. 24A and 24B and 25, the selection item k1 is used to receive an instruction input to search as a search target a keyword list listing recognized words as keywords. The selection item k2 is used to receive an instruction input to search as a search target a keyword list listing names of recognized performers as keywords.

Similarly as shown in FIGS. 24A, 24B and 25, the selection item k3 is used to receive an instruction input to search as a search target a keyword list listing recognized program titles as keywords. The selection item k4 is used to receive an instruction input to search as a search target a keyword list listing recognized genres as keywords.

When the keyword list of the performer's names is selected as the search target as represented by a dual-lined box in FIG. 24A, a display screen G shows a column selection area 1G, a row-level selection area 2G, and a performer name selection area 3G. The column selection area 1G is used to select one of the ten columns of the Japanese kana syllabary. The row-level selection area 2G is used to select one of the kana characters contained at the column selected in the column selection area 1G. The performer name selection area 3G is used to select a performer's name having as a leading character the character selected in the row-level selection area 2G.

The user can select a column containing a target character by moving a cursor in the column selection area 1G. As shown in FIG. 24A, an "あ" (kana character pronounced a) column is selected. The row-level selection area 2G shows kana characters "あ," "い"(pronounced i), "う"(pronounced u), "え"(pronounced e), and "お"(pronounced o), contained in the "あ" column. A target kana character is selected by moving the cursor in the row-level selection area 2G.

If the kana character "あ" is selected as shown in FIG. 24B, the performer name selection area 3G lists performers' names having the kana character "あ" as the leading character thereof in the order of the Japanese kana syllabary. If the kana character "い" is selected in the row-level selection area 2G as shown in FIG. 25, the performer name selection area 3G lists performer's names having the kana character "い" as the leading character thereof in the order of the Japanese kana syllabary. The user can select a target performer's name by moving the cursor to the performer's name in the performer name selection area 3G.

The user can thus select a performer's name by operating the cursor in each of the column selection area 1G, the row-level selection area 2G, and the performer name selection area 3G as shown in FIGS. 24A, 24B and 25. The cursor is shifted from one selection area to another selection area and then moved within each selection area. Since the user performs the area-to-area cursor shifting operation and the in-area cursor shifting operation, the cursor operation becomes complicated.

When the cursor is shifted, the user's view point also keeps track of the shifting movement of the cursor on the screen. A quick action of inputting characters is thus impeded. If the user attempts to move quickly the cursor in position on the screen, the user's view point also moves. There is a speed limitation on the movement speed of the cursor. If there are many keyword candidates, it takes time for the user to place the cursor onto character candidates. This inconveniences the user.

It may thus be desirable to select quickly a target character through a simple operation and to search for and/or input the text information.

According to one embodiment of the present invention, an information processing apparatus for searching for a target text information candidate from among text information candidates stored in order to search for and/or input target information, may include display information generating means for generating and displaying display information, the display information including only both a first character line of characters extending in a first direction including a character set to be selected, and a second character line of characters related to the first character line, extending in a second direction and intersecting the first character line, out of a two-dimensional matrix of rows and columns of characters arranged for selection, and shift instruction receiving means for receiving a shift instruction to shift from the character set to be selected.

The display information generating means may arrange the two-dimensional matrix of rows and columns of characters arranged for selection, and display a character line containing the character set to be selected, and one character line related to the and intersecting the first character line. In response to the shift instruction, the information processing apparatus may shift to another character the character set to be selected.

In this way, the information processing apparatus may thus display one character line containing the character set to be selected, and the other character line related to and intersecting the one character line instead of displaying all the two-dimensional matrix of characters. The user can thus quickly select a target character in a simple operation while precisely recognizing the position of the target character in the two-dimensional matrix of characters. The user can quickly search for and/or input the text information.

When the shift instruction input is received by the shift instruction receiving means, the display information generating means may generate the display text information by changing a display position of the characters without changing a selection position on a display screen so that the character set to be selected at the selection position may be changed.

When the shift instruction receiving means receives the shift instruction input, the display information generating means may change the character set to be selected by shifting the position of the character without shifting the selection position on the screen.

The selection position of the character, i.e., the position of a cursor pointing to the character for selection, may remain at the same position. The view point of the user can stay fixed on a screen. The information processing apparatus may thus be free from any limitation that could be applied in character displaying in consideration of the shifting of the view point of the user. The user can search for and input the text information by selecting quickly the target character in a simple operation.

The information processing apparatus may further include entry receiving means for receiving an entry instruction input for entering a character set to be selected as a leading character of the text information candidate to be searched, and information candidate generating means for generating and displaying display information for displaying the text information candidate containing as a leading character the character selected and entered when the entry receiving means receives the entry instruction input.

The entry receiving means may enter the character set to be selected as the leading character of the text information candidate to be searched. The information candidate generating means may generate and display the display information for displaying the text information candidate containing as the leading character the character to be entered.

The text information containing as the leading character the character set to be entered may contain not only text information having as the leading character the character set to be selected, but also text information having the same yomigana (pronunciation) as the leading character thereof. Written Japanese language is mainly a mixture of kana characters (phonetic characters) and kanji characters (ideographic characters). Kanji characters may also be phonetically expressed using kana characters. Complex kanji characters are sometimes accompanied by kana characters as a pronunciation guide. In such a case, a kana is referred to as a yomigana (literally reading kana). For example, if the character set to be selected is kana character "あ" (pronounced a), text information such as "あい" (two kana characters pronounced ai), "愛" (kanji character pronounced ai) and "藍" (kanji character pronounced ai) is displayed as text information candidates. It is noted that all these candidates have commonly the yomigana "あ" (pronounced a) as the leading character.

When the leading one character is merely entered, the text information as a candidate having that character as the leading character may be displayed. The user can search for and input text information by selecting quickly a target character in a simple operation.

The information processing apparatus may further include sort receiving means for receiving a sorting instruction input to sort text information candidates having the common feature from among the text information candidates displayed in response to the display information generated by the information candidate generating means, sorting information generating means for generating and displaying display information, the display information for sorting the text information candidates having the common feature and displaying sorting results when the sort receiving means receives the sorting instruction input, and selection receiving means for receiving a selection instruction input to select a target candidate from among the text information candidates displayed in response to the display information generated by the sorting information generating means.

When the sort receiving means receives the sorting instruction input, the sorting information generating means may list and then display the text information candidates having the common feature. The user can select a target text information candidate from among the listed text information candidates using the selection receiving means.

Since text information of Japanese family names such as "愛川"(pronounced ai-kawa), "愛田" (pronounced ai-da), and 愛山"(pronounced ai-yama) has a common kanji character " 愛 " (pronounced ai), the text information is sorted by the kanji character "愛". By selecting the kanji character "愛, "the text information such as"愛川,""愛田," and 愛山 "can be selected. For example, " 相川 "(pronounced ai-kawa), " 合川 "(pronounced ai-kawa), " 藍川 "(pronounced ai-kawa), " 相田 "(pronounced ai-da), " 合田 "(pronounced ai-da), and " 藍田 "(pronounced ai-da) having different first kanji characters but the same pronunciation "ai" may be displayed as clearly different characters. In this way, the user can search for and/or input text information by selecting quickly a target character in a simple operation.

Each character in the two-dimensional matrix may include a Japanese kana character in the Japanese kana syllabary of a two-dimensional matrix of rows and columns of kana characters.

The information processing apparatus may use each character in the two-dimensional matrix as a Japanese kana character in the Japanese kana syllabary of a two-dimensional matrix of kana characters. The Japanese kana syllabary lists a " あ "column through a " わ "column, each column composed of five kana characters. The kana characters are two-dimensionally arranged in rows and columns, and the position of each kana character is precisely recognized.

The user can thus visualize the two-dimensional arrangement of the characters. With the Japanese kana syllabary, the user can also search for and/or input text information by selecting quickly a target character in a simple operation.

A target text information candidate may be searched in the prestored text information candidates. In the searching and/or inputting of target information, the user can search for and/or input text information by selecting quickly a target character in a simple operation.

BRIEF DESCRIPTION OF THE DRAWINGS

FIGS. 7A-7C illustrate a display example of inputting a specific keyword;

FIGS. 12A-12C illustrate a display example in which a character selected is changed in the two-dimensionally arranged Japanese kana syllabary;

FIGS. 13A-13C illustrate a display example in which a character selected is changed in the two-dimensionally arranged Japanese kana syllabary;

DETAILED DESCRIPTION

Apparatuses, methods, and computer programs according to embodiments of the present invention are described below with reference to the drawings. In the discussion that follows, the apparatuses, the methods and the computer programs of the embodiments of the present invention are incorporated in a hard disk recorder.

First Embodiment

Figure 1:
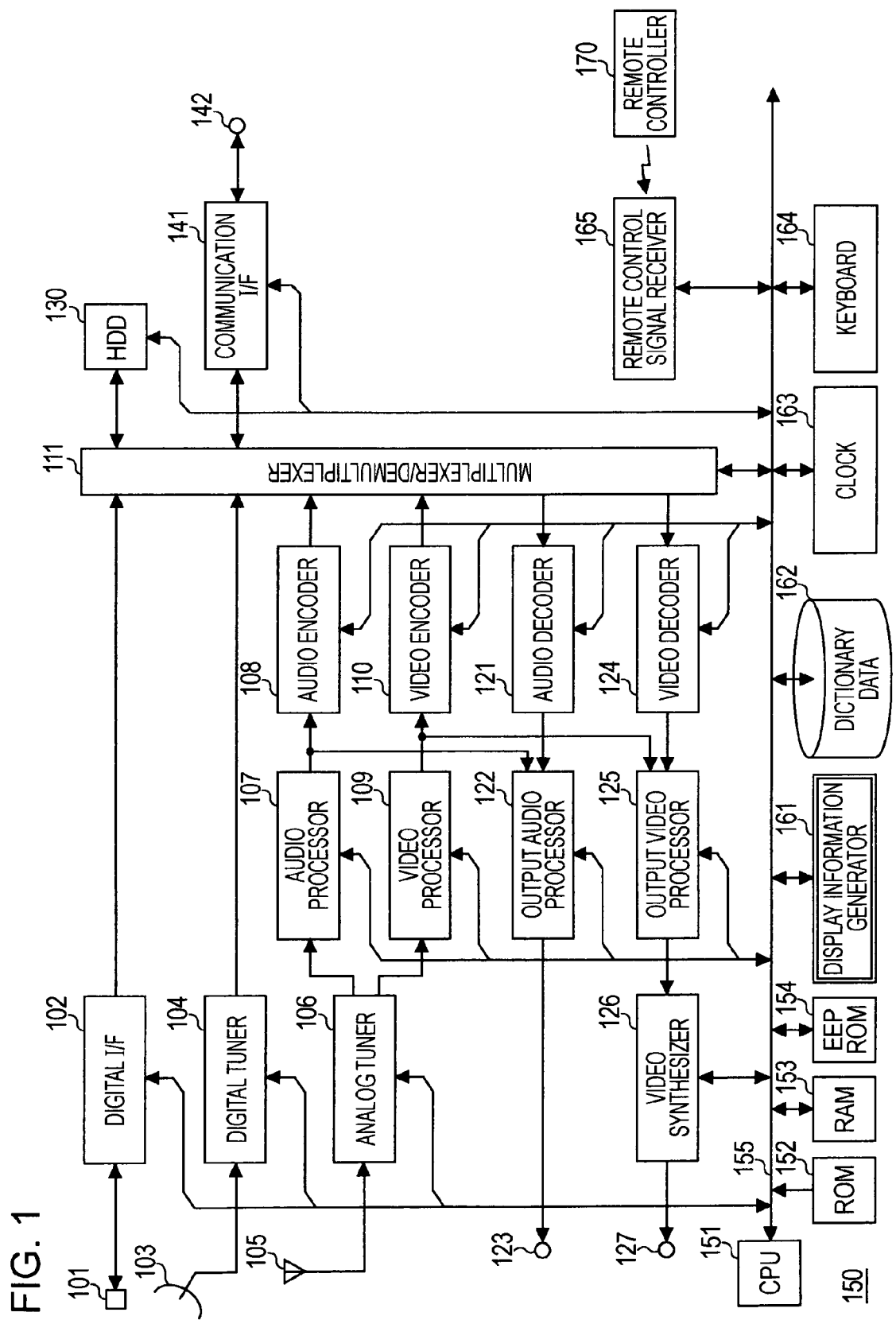
FIG. 1 is a block diagram of a hard disk recorder according to a first embodiment of the present invention.

FIG. 1 is a block diagram illustrating a hard disk recorder according to a first embodiment of the present invention. As shown in FIG. 1, the hard disk recorder of the first embodiment of the present invention includes a digital input-output terminal 101, and a digital interface (I/F) 102 in an input line thereof.

The hard disk recorder of the first embodiment of the present invention includes in the input system thereof a digital broadcast receiving antenna 103, a digital tuner 104, an analog broadcast receiving antenna 105, and an analog tuner 106. Connected to the analog tuner 106 are an audio processor 107, an audio encoder 108, a video processor 109, and a video encoder 110.

The hard disk recorder includes in the output system thereof an audio decoder 121, an output audio processor 122, an audio output terminal 123, a video decoder 124, an output video processor 125, a video synthesizer 126, and a video output terminal 127. The hard disk recorder further includes a multiplexer/demultiplexer 111 for multiplexing and demultiplexing data and a hard disk drive (HDD) 130. The HDD 130 includes a hard disk having a memory capacity of several hundred Gigabytes or larger.

The hard disk recorder of the first embodiment of the present invention further includes a communication interface (I/F) 141 and a connection terminal 142 for connection with a wide-area network such as the Internet. The hard disk recorder can thus retrieve or transmit a variety of information via the wide-area network.

The hard disk recorder of the first embodiment of the present invention includes a controller 150 for controlling generally the hard disk recorder. As shown in FIG. 1, the controller 150 is a microcomputer including a central processing unit (CPU) 151, a read-only memory (ROM) 152, a random-access memory (RAM) 153, an electrically erasable and programmable ROM (EEPROM) 154, and a CPU bus 155 connecting one element with another in the hard disk recorder.

The CPU 151 executes a program stored on the ROM 152 to be discussed later or the like, generates and supplies a control signal to each element, and receives and processes data from each element. The CPU 151 thus generally controls the hard disk recorder. As previously discussed, the ROM 152 stores a variety of programs to be executed by the CPU 151 and data used in the execution of the programs.

The RAM 153 serves as a working area for storing temporarily results of each process. The EEPROM 154 is a nonvolatile memory. The EEPROM 154 stores data that needs to be continuously stored even with the hard disk recorder of the first embodiment of the present invention in a power-off state, for example, a variety of setting parameters and process results, and a program newly supplied for function upgrading via a network.

Connected to the controller 150 are a display information generator 161, a dictionary data memory 162, a clock 163, a keyboard 164, and a remote control signal receiver 165. As will be described in detail later, the display information generator 161 under the control of the controller 150 generates display information to search for and input text information, and supplies the display information to the video synthesizer 126 via the controller 150. The dictionary data memory 162 stores a variety of dictionary information, such as a name list, a geographical name dictionary, and a variety of dictionary data.

The clock 163, having a calendar function, provides present time, day, month and year. The clock 163 also counts time. The keyboard 164 includes a variety of operation keys, operation switches, and operation controls. The keyboard 164 receives a variety of operation inputs from a user, converts a received operation input into an electrical signal, and then supplies the electrical signal to the controller 150.

The remote control signal receiver 165 receives an infrared remote control signal from a remote controller 170, converts the infrared remote control signal into an electrical signal, and then supplies the electrical signal to the controller 150. As will be described in detail later, the remote controller 170 having a variety of operation keys generates an infrared remote control signal in response to a user operation and then transmits the remote control signal.

A recording operation of content data in the hard disk recorder of the first embodiment of the present invention is described below. As previously described, the hard disk recorder of the first embodiment of the present invention records, on the hard disk in the HDD 130, (1) digital content data received via the digital input-output terminal 101 and the digital interface 102, (2) a digital broadcast program received and selected via the digital tuner 104, and (3) an analog broadcast program received and selected via the analog tuner 106.

(1) Digital Content Data Received Via Digital Interface 102

The digital input-output terminal 101 and the digital interface 102 comply with Institute of Electrical and Electronics Engineers (IEEE) 1394 standards, universal serial bus (USB) standard, or the like. The digital input-output terminal 101 and the digital interface 102 can connect to an external device, such as a digital still camera or a digital video camera, complying with the same standard.

Via the digital input-output terminal 101 and the digital interface 102, the hard disk recorder receives content data from the external device connected thereto. In response to the content data, the hard disk recorder then stores the content data onto a hard disk 120. The hard disk recorder may also generate and output an analog video signal, and an analog audio signal. The content data may include still image data, moving image data, audio data, and audio-video (AV) data composed of audio data and video data to be reproduced in synchronization.

The AV data supplied from the external device may be now processed. The AV data received via the digital input-output terminal 101 is supplied to the digital interface 102. The digital interface 102 performs a process, such as a format conversion, onto the supplied AV data to be compatible with a format of the hard disk recorder of the first embodiment of the present invention, thereby generating a transport stream (TS) signal into which data is packetized. The digital interface 102 then supplies the TS signal to the multiplexer/demultiplexer 111.

The multiplexer/demultiplexer 111 analyzes and generates control signals, and generates a TS signal to be recorded onto the hard disk 120 so that the TS is recorded on the hard disk in the HDD 130. If the content data is AV data, the TS signal may be made by packetizing and multiplexing audio data and video data, and additional data such as control data.

The multiplexer/demultiplexer 111 extracts an audio packet and a video packet from the TS signal supplied from the digital interface 102. The multiplexer/demultiplexer 111 generates an audio elementary stream (ES) from the extracted audio packet and a video ES from the video packet. The audio ES thus generated is supplied to the audio decoder 121 and the video ES is supplied to the video decoder 124. Each packet is accompanied by an identifier (ID). Based on the identifier, the multiplexer/demultiplexer 111 discriminates and extracts the audio data and the video data from the other control data.

The audio decoder 121 decodes the supplied audio ES, thereby obtaining baseband audio data. The baseband audio data is then supplied to the output audio processor 122. The output audio processor 122 performs on the supplied audio data a filtering process, a fading process, a speech rate conversion process, a digital-to-analog conversion process, etc. The output audio processor 122 thus generates an analog processed signal to be output, and then supplies the analog processed signal to the audio output terminal 123.

The multiplexer/demultiplexer 111 separates an audio signal responsive to the audio ES from the TS signal supplied from the digital interface 102. The audio signal is finally output from the audio output terminal 123. A sound responsive to the audio signal is emitted from a loudspeaker connected to the audio output terminal 123.

The video decoder 124 decodes the supplied video ES, thereby obtaining baseband video data. The baseband video data is then supplied to the output video processor 125. After performing processes including a filtering process on the supplied video data, the output video processor 125 supplies the processed video data to the video synthesizer 126.

The video synthesizer 126 performs a synthesis process. For example, the video synthesizer 126 overlays text information, generated by the display information generator 161 and then supplied from the controller 150, onto the video data from the output video processor 125 or partially displays the vide data from the output video processor 125. The video synthesizer 126 also performs a conversion process, a digital-to-analog conversion process, and the like on YC (color difference signal). The video synthesizer 126 thus generates an output analog video signal and then supplies the generated output analog video signal to the video output terminal 127.

In this way, the multiplexer/demultiplexer 111 separates the video signal responsive to the video ES from the TS signal supplied from the digital interface 102. The video signal is then output from the video output terminal 127. A monitor display connected to the video output terminal 127 thus displays a video responsive to the video signal on the display screen thereof.

The convent data such as the AV data received via the digital input-output terminal 101 and the digital interface 102 is stored onto the hard disk in the HDD 130. The content data also is used to generate the analog audio signal and the analog video signal to be played. The analog audio signal and the analog video signal are supplied to an external device via the audio output terminal 123 and the video output terminal 127, respectively. A sound and a video respectively responsive to the analog audio signal and the analog video signal are then played.

(2) Digital Broadcast Program Received and Selected Via the Digital Tuner 104

The content data received and selected via the digital tuner 104 may be recorded or played as described below. The digital tuner 104 is a digital broadcasting satellite (BS) and communication satellite (CS) tuner in the first embodiment of the present invention. The digital tuner 104 can receive and select a BS digital broadcast signal and a CS digital broadcast signal.

A digital terrestrial television broadcast signal can also be received and selected with the a tuner for digital terrestrial television arranged. The operation of such a tuner is substantially identical to the reception and selection operation of the digital tuner 104 for the BS digital broadcast signal and the CS digital broadcast signal, and is omitted here in this specification.

The digital broadcast signal received at the digital broadcast receiving antenna 103 from a satellite is supplied to the digital tuner 104. In response to a channel selection control signal supplied from the controller 150 in response to a user's channel selection instruction, the digital tuner 104 receives and selects a target digital broadcast signal and supplies the received and selected digital broadcast signal to the multiplexer/demultiplexer 111.

The digital broadcast signal is in a TS signal format into which audio data and video data, forming a broadcast program, a variety of control data and other data are packetized and multiplexed. The control data contains, on each channel as a program transmission path, channel selection information called program specific information (PSI), and electronic program guide (EPG) data.

Each packet is tagged with an identifier (ID). In accordance with the identifier, the multiplexer/demultiplexer 111 extracts the PSI data and the EPG data, and extracts a video (image) packet and an audio packet forming the same program.

The multiplexer/demultiplexer 111 extracts the PSI data and the EPG data from the TS signal from the digital tuner 104. The multiplexer/demultiplexer 111 then supplies the PSI data and the EPG data to the controller 150, thereby enabling the controller 150 to select a program and producing an EPG. The controller 150 outputs the EPG to be displayed in response to a user's instruction. The controller 150 thus enables the user to select a TV program or to program recording of a TV program through the EPG. The PSI data and the EPG data may be stored on the EEPROM 154. The PSI data and the EPG may also be stored on a predetermined region of the HDD 130 as necessary, and then read to be used on the controller 150 as appropriate.

If an instruction to record the selected broadcast program is provided, the multiplexer/demultiplexer 111 extracts from the TS signal from the digital tuner 104 the video packet and audio packet of a target broadcast program selected by the user, generates a new TS signal composed of the video packet and audio packet and control data, and then supplies the TS signal to the HDD 130 to be recorded on the hard disk.

The multiplexer/demultiplexer 111 also produces the audio ES from the audio packet of the target broadcast program extracted from the TS signal from the digital tuner 104, and supplies the audio ES to the audio decoder 121. The multiplexer/demultiplexer 111 also produces the video ES from the video packet of the target broadcast program extracted from the TS signal, and then supplies the video ES to the video decoder 124.

As previously discussed, the audio decoder 121 decodes the audio ES, thereby generating the baseband audio data. The output audio processor 122 performs a filtering process and other process on the baseband audio signal, and then digital-to-analog converts the processed audio signal into an output analog signal. The output analog signal is then output from the audio output terminal 123.

The video decoder 124 decodes the video ES, thereby generating the baseband video signal. The output video processor 125 performs a filtering process and other process on the baseband audio signal. The video synthesizer 126 synthesizes the video data processed by the output video processor 125 with display data such as the text information from the controller 150. The video synthesizer 126 converts the synthesized video data into YC data and digital-to-analog converts the synthesized video data into an output analog video signal. The output analog video signal is then output from the video output terminal 127.

In the hard disk recorder of the first embodiment of the present invention, the digital tuner 104 receives and selects the digital broadcast signal. The video data and audio data of the target program are extracted from the received and selected digital broadcast signal and then recorded onto the hard disk on the HDD 130. The analog video signal and analog audio signal are also produced and output. The broadcast program supplied as the digital broadcast signal is recorded onto the hard disk on the HDD 130 while the broadcast program is viewed.

As described above, the TS signal newly produced in the multiplexer/demultiplexer 111 can be supplied to another device via the digital interface 102 and the digital input-output terminal 101.

(3) Analog Broadcast Program Received and Selected Via the Analog Tuner 106

An operation of the analog tuner 106 receiving an analog signal, recording the analog signal on the HDD 130 and outputting the analog signal is described below. The analog tuner may receive and select one of a terrestrial analog television broadcast signal and a radio broadcast signal such as a terrestrial amplitude modulation (AM) broadcast signal or a terrestrial frequency modulation (FM) broadcast signal. In the hard disk recorder of the first embodiment of the present invention, the analog tuner 106 receives and selects a terrestrial analog television broadcast signal.

According to the first embodiment of the present invention, the analog tuner 106 receives and selects a terrestrial analog television broadcast signal, and demodulate the analog television broadcast signal into an analog video signal and an analog audio signal. The analog tuner 106 supplies the analog audio signal to the audio processor 107 and the analog video signal to the video processor 109.

The audio processor 107 converts the supplied audio signal into a digital audio signal, and then supplies the digital audio signal to each of the audio encoder 108 and the output audio processor 122. The audio encoder 108 performs a data compression process on the supplied audio data in accordance with a predetermined data compression method such as MPEG method, thereby producing an audio ES. The resulting audio ES is supplied to the multiplexer/demultiplexer 111.

On the other hand, the video processor 109 performs a YC separation process on the supplied video signal, thereby separating the supplied video signal into a luminance signal Y and a color difference signal C. The video processor 109 performs an analog-to-digital conversion and a chroma decode process on the luminance signal Y and the color difference signal C, thereby resulting in digital component video data (video data). The video processor 109 further performs a variety of video processes such a filtering process on the video data. The processed video data is then output to each of the video encoder 110 and the output video processor 125.

The video processor 109 separates the supplied video signal into a horizontal synchronization signal, a vertical synchronization signal, and a field determination signal, mutually in synchronization with each other. In response to these separated signals, the video processor 109 generates a clock signal and a synchronization signal to provide timings to each element in the hard disk recorder.

The video encoder 110 data compresses video data from the video processor 109 in accordance with a predetermined data compression method such as the MPEG method, thereby generating the video ES. The video encoder 110 supplies the generated video ES to the multiplexer/demultiplexer 111.

During recording, the multiplexer/demultiplexer 111 multiplexes the audio ES from the audio encoder 108, the video ES from the video encoder 110, and a variety of control signals. More specifically, during recording, the multiplexer/demultiplexer 111 performs a multiplexing process on an MPEG audio ES, an MPEG video ES, and the variety of control signal in combination, all input thereto, thereby generating a TS signal for an MPEG system. The TS signal thus generated is recorded onto the hard disk in the HDD 130.

As previously discussed, the audio data from the audio processor 107 is supplied to not only the audio encoder 108 but also the output audio processor 122. The video data from the video processor 109 is supplied to not only the video encoder 110 but also the output video processor 125.

As previously discussed, the output audio processor 122 digital-to-analog converts the supplied audio data, thereby generating and outputting the output analog audio signal. As previously discussed, the output video processor 125 generates the output analog video signal and then outputs the generated output analog video signal via the video synthesizer 126.

More specifically, the analog signal supplied via the analog tuner 106 is converted into the digital signal and then recorded onto the hard disk in the HDD 130. In parallel with this recording operation, the audio data and video data to be recorded are reproduced and output.

Even the signal acquired through the analog tuner 106 may be converted into a digital signal, and the digital signal may then be output through the digital interface 102 and the digital input-output terminal 101.

An operation of the hard disk recorder of the first embodiment of the present invention to play the video data and audio data recorded on the hard disk in the HDD 130 is described below. A TS signal on the hard disk in the HDD 130 is read under the control of the controller 150 and the read TS signal is then supplied to the multiplexer/demultiplexer 111.

During playing, the multiplexer/demultiplexer 111 separates a video ES and an audio ES from the TS signal read from the hard disk in the HDD 130, supplies the separated audio ES to the audio decoder 121 and the separated video ES to the video decoder 124.

The process of the audio decoder 121 and subsequent elements and the process of the video decoder 124 and subsequent elements are identical to those previously discussed with reference to the recording process of the signal from the digital tuner 104. More specifically, the audio decoder 121 decodes the supplied audio ES, thereby generating the baseband audio data and supplying the generated baseband audio data to the output audio processor 122. The output audio processor 122 performs the filtering process on the baseband audio data and digital-to-analog converts the filtered audio data into the output analog audio signal. The output analog audio data is then supplied to the audio output terminal 123.

On the other hand, the video decoder 124 decodes the supplied video ES, thereby generating the baseband video data. The video decoder 124 supplies the generated baseband video data to the output video processor 125. The output video processor 125 performs a variety of processes including a filtering process on the video data and then supplies the processed video data to the video synthesizer 126. The video synthesizer 126 synthesizes the supplied video data with the display information from the controller 150, converts the supplied video data into YC data, and digital-to-analog converts the YC data into an output analog video signal. The output analog video data is then output via the video output terminal 127.

The user can thus view and listen to a video and sound respectively responsive to the vide data and audio data read from the hard disk in the HDD 130, output from a loudspeaker connected to the audio output terminal 123 and on a monitor display connected to the video output terminal 127, or from a TV set including a loudspeaker and a monitor display.

Furthermore, the video data and audio data read from the hard disk in the HDD 130 may be output via the digital interface 102 and the digital interface 102.

As previously discussed, the hard disk recorder of the first embodiment of the present invention includes the communication interface 141 and the connection terminal 142. The hard disk recorder is thus connected to a network such as the Internet via a telephone line, for example. The hard disk recorder can thus retrieve a variety of data via the network, and transmit a variety of data via the network.

The data to be transmitted or received includes a variety of programs and text data in addition to the video data and audio data. The video data and audio data can be recorded onto the HDD 130 via the multiplexer/demultiplexer 111.

An audio signal playing system includes the multiplexer/demultiplexer 111, the audio decoder 121, the output audio processor 122, and the audio output terminal 123. A video signal playing system includes the video decoder 124, the output video processor 125, the video synthesizer 126, and the video output terminal 127. The video data and audio data acquired via the communication network can be played and used using the audio signal playing system and the video signal playing system.

The vide data and audio data acquired via the communication interface 141 and the connection terminal 142 may be output via the digital interface 102 and the digital input-output terminal 101.

A program and control data used in the hard disk recorder of the first embodiment of the present invention may be received via the network, stored onto the EEPROM 154 or the like, and then used as appropriate.

The function of the hard disk recorder of the first embodiment of the present invention may be upgraded via the communication network. By retrieving beforehand the EPG data via the communication network, the EPG may be produced.

According to the first embodiment of the present invention, the audio encoder 108 and the video encoder 110 respectively compress the audio data and the video data in accordance with the MPEG method, for example, and the audio decoder 121 and the video decoder 124 respectively decompress the audio ES and the video ES in accordance with the MPEG method, for example.

The data compression method used in the hard disk recorder of the first embodiment of the present invention is the MPEG method. Alternatively, another data compression method may be used. Furthermore, data may be processed without being compressed.

As shown in FIG. 1, the hard disk recorder of the first embodiment of the present invention includes the display information generator 161. With the display information generator 161, the hard disk recorder generates display information for searching for and inputting text information, and supplies the display information to the video synthesizer 126 via the controller 150. The display information is thus displayed.

More specifically, when the information of the EPG data is searched, or when index information attached to content data to be recorded on the hard disk is searched, text information is searched. When tag information is attached to the content data recorded on the hard disk, text information is input.

When the digital television broadcast signal is received via the digital tuner 104 as previously discussed, the EPG data can be retrieved from the digital television broadcast signal. In the case of the analog television broadcast signal received via the analog tuner 106, the EPG data of analog television broadcasting can be obtained. For example, a broadcast signal from a predetermined television broadcasting station provides EPG data service, such as TV-Asahi Data and Multimedia Service (ADAMS) or G-Guide, related to an analog television broadcast program. Furthermore, the EPG data of a television broadcast program or a radio broadcast program may be obtained from a web page provided by a broadcasting company via the Internet.

In this way, the hard disk recorder of the first embodiment of the present invention acquires and uses a variety of EPG data. The EPG data contains information related to each program, including broadcasting time and date, genre, performers, contents (synopsis) of each program, etc. The EPG data contains a large amount of text information. If the EPG data is merely displayed for viewing, the user can overlook a desired program. For example, the user may want to search for a program on which a performer of interest appears, or search for a program of a genre of interest.

The hard disk recorder of the first embodiment of the present invention, including a high-capacity hard disk, stores a vast amount of content data. In order to use efficiently the vast amount of content data, the hard disk recorder records the content data with index information attached thereto.

In the case of broadcast content data acquired via one of the digital tuner 104 and the analog tuner 106, the index information of the broadcast content data may be extracted from the EPG data acquired as described above. In the case of content data acquired via the digital input-output terminal 101 and the digital interface 102, tag information attached by the user may be used as the index information.

When the text information is searched, the entire text information (keyword) to be searched is typically entered. For example, when the name of a performer is a keyword, the whole name of the performer is input. A search range covers the EPG data or the index information attached to the content data stored on the hard disk.

The search range of the text information is within information of the EPG data or the like stored on the hard disk recorder of the first embodiment of the present invention. The EPG data and the index information attached to the content data, recorded on the hard disk recorder of the first embodiment of the present invention, are thus analyzed to extract the keyword. The hard disk recorder then determines the attribute of the keyword, i.e., determines whether the keyword is a name of a performer, a program title, a genre, or any other word. The hard disk recorder generates a keyword list on a per attribute basis (list of keyword candidates selectable). The user can thus input the keyword through the keyword list.

With a keyword ready to be entered through the keyword list on the hard disk recorder, the user can display and select a keyword candidate from the keyword list by entering merely minimum selectable text information from the head of the target keyword rather than entering the entire keyword information.

With the function of the display information generator 161 in the hard disk recorder of the first embodiment of the present invention, the minimum selectable text information is displayed in the keyword inputting. The user can input the text information by selecting quickly a target character in a simple operation.

The dictionary data memory 162 in the hard disk recorder of the first embodiment of the present invention stores a variety of dictionary information, such as a name list, a geographical name dictionary, and a variety of dictionary data. As will be described later, the dictionary data memory 162 may be used to attach the tag information to content data recorded on the hard disk.

As previously discussed, the clock 163, having the calendar function, provides present day, month, and year information and present time information. In cooperation with the controller 150, the clock 163 also performs a programmed recording operation of a target program.

The user enters programmed-recording information of a desired broadcast program (information relating to broadcasting time and date and broadcasting channel) through, for example, the EPG data using the keyboard 164 and the remote controller 170. The controller 150 monitors the present time supplied from the clock 163. At the moment it is a start time of programmed-recording time, the controller 150 controls each element in the hard disk recorder in order to programmed-record a broadcast program onto the hard disk in the HDD 130.

The keyboard 164 is arranged in the hard disk recorder of the first embodiment of the present invention. The keyboard 164 includes operation keys including a power on/off key, a broadcast channel selection key, a recording start key, a stop key, a play start key, a fast-forward key, a return key, and a pause key.

Figure 2:
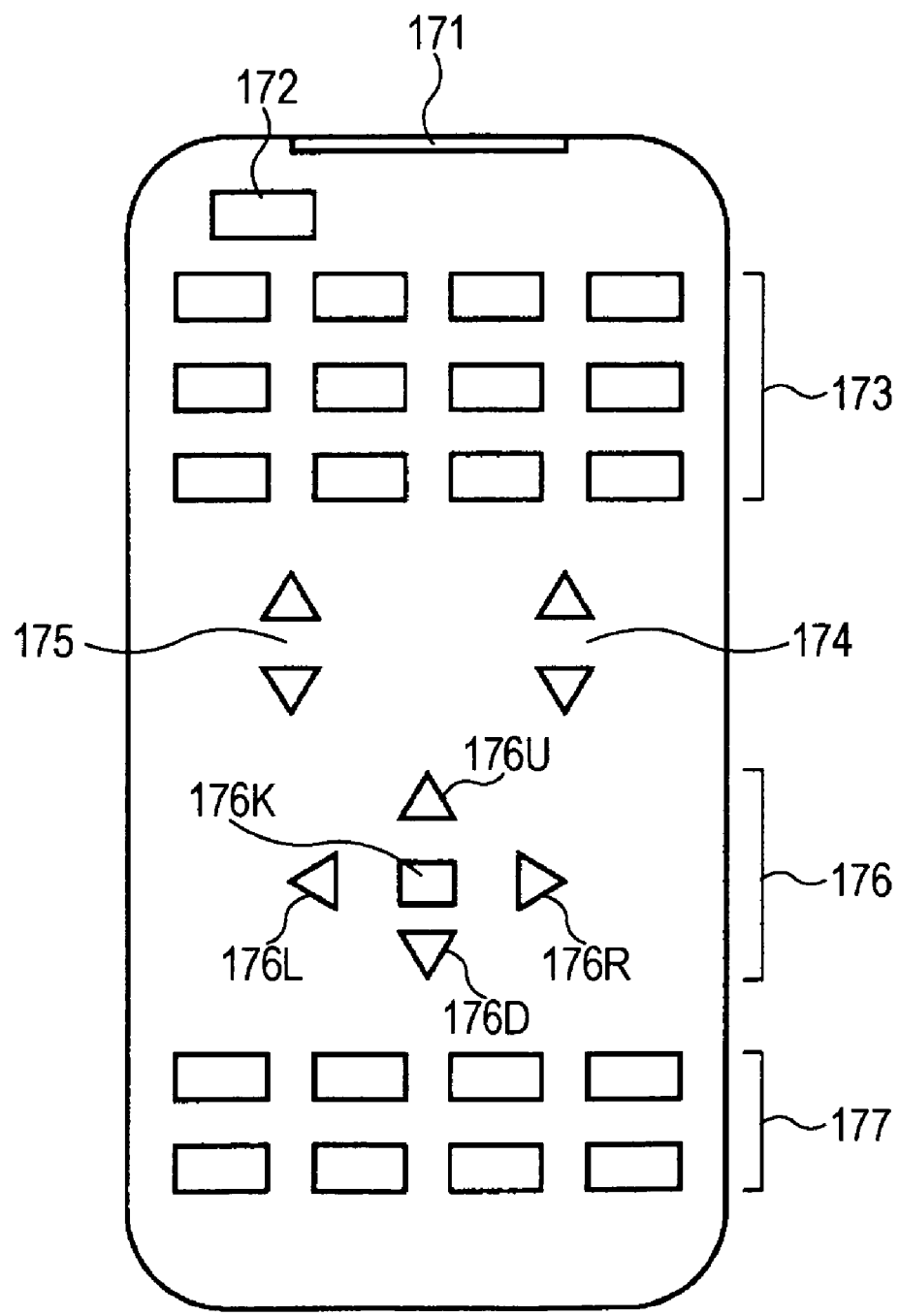
FIG. 2 is an external view of a remote controller of the hard disk recorder of FIG. 1.

The remote controller 170 is relatively compact. Using the remote controller 170, the user can perform all the functions of the hard disk recorder of the first embodiment of the present invention. FIG. 2 is an external view of the remote controller 170 of the hard disk recorder of the first embodiment of the present invention.

As shown in FIG. 2, the remote controller 170 includes a remote control signal light emitter (remote control signal transmitter) 171 at the top end thereof. The remote controller 170 also includes a power on/off key 172, numerical keys 173, channel up/down keys 174, volume up/down keys 175, and cursor keys 176. The cursor keys 176 includes an up key 176U, a down key 176D, a right key 176R, a left key 176L, and an enter key 176K.

The remote controller 170 also includes function keys 177. The function keys 177 include a recording start key, a play start key, a fast-forward key, a fast-return key, a stop key, a pause key, a menu key, etc.

When the text information is searched and/or input in the hard disk recorder of the first embodiment of the present invention as previously described, the text information such as the keyword is input easily and quickly using the cursor keys 176 with reference to the selectable text information generated and displayed by the display information generator 161.

An input example of the keyword in the searching process performed on the hard disk recorder of the first embodiment of the present invention is described with reference to display screens of FIGS. 3A-3C through FIGS. 8A and 8B.

As previously described, the hard disk recorder of the first embodiment of the present invention can search the EPG data to view a desired broadcast program or programmed-record the desired broadcast program. The hard disk recorder can also search the index information of the content data to find target content out of a large amount of content data stored on the hard disk.

When the user presses the menu key of the function keys 177 on the remote controller 170 of FIG. 2, the controller 150 controls the display information generator 161 to display a list of executable functions. For example, if one of a broadcast program to be viewed and a broadcast program to be programmed-recorded is searched, the user selects an item "search in EPG data" from a list of executable function using the cursor keys 176.

If desired content data is searched from among a large number of pieces of content data stored on the hard disk, the user selects an item "search for index information of stored data" from the list of executable functions using the cursor keys 176 on the remote controller 170.

Such a selection input is transmitted from the remote controller 170 as a remote control signal. The remote control signal receiver 165 receives the remote control signal and converts the received remote control signal into an electronic signal. The electronic signal is then supplied to the controller 150. The display information generator 161 under the control of the controller 150 generates an initial screen receiving a keyword input, and then supplies the initial screen to the video synthesizer 126 via the controller 150. The screen receiving the keyword input is then displayed on the display screen of the monitor display connected to the video output terminal 127.

FIGS. 3A-3C through FIGS. 8A and 8B illustrate the display screen that is updated in response to the reception of the keyword input. As previously discussed, when an instruction of the keyword search process is provided, the display information generator 161 generates the display information for displaying the initial screen receiving the keyword input shown in FIG. 3A and then displays the display information.

Figure 3A:
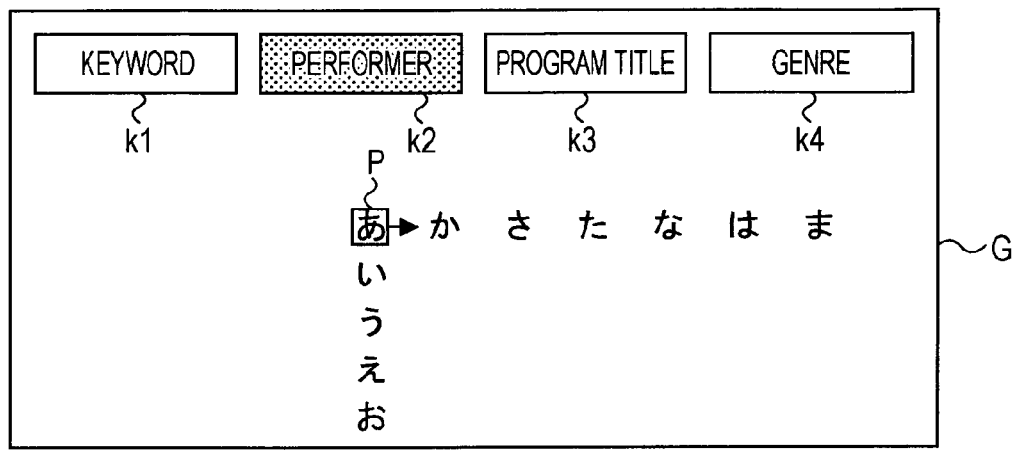
FIGS. 3A-3C illustrate a display example of inputting a specific keyword.

As shown in FIG. 3A, attribute selection items k1-k4 of keywords are arranged at the top row of the screen to select the attribute of the keyword to search. The selection item k1 is used to select a keyword list of general nouns other than "performer," "program title," and "genre" as keyword candidates.

The "performer" is used to select a keyword list of performer names and the like, as the keyword candidates, appearing on the program as the content data. The performers and the like include name information of a variety of people including performers, entertainers, directors, stage directors, producers, and original authors.

The "program tile" is used to select, as the keyword candidates, a keyword list of program titles as the content data. The "genre" is used to select, as the keyword candidates, a keyword list of genres of the content data. For example, the keyword list of genres may be information such as "sports," "news," "variety shows," and "drama." For simplicity of explanation, the selection item k2 "performer" is selected, and the "performer" is selected as a search keyword in the first embodiment of the present invention.

In the initial screen of FIG. 3A, a row of a first row-level kana characters of the ten columns of "あ" column through "わ"column of the Japanese kana syllabary are shown on the display screen G. The Japanese kana syllabary is composed fifty-one kana characters, i.e., ten columns of five kana characters and a kana character A, "ん"(pronounced n). The ten columns of kana characters include the "あ"(pronounced a) column, "か"(pronounced ka) column, "さ"(pronounced sa) column, "た"(pronounced ta) column, "な"(pronounced na) column, "は"(pronounced ha) column, "ま"(pronounced ma) column, "や"(pronounced ya) column, "ら"(pronounced ra) column, and "わ"(pronounced wa) column. The "あ"column include kana characters "あ,""い"(pronounced i), "う"(pronounced u), "え"(pronounced e), and "お"(pronounced o). The "か"column include kana characters "か,""き"(pronounced ki), "く"(pronounced ku), "け"(pronounced ke), and "こ"(pronounced ko). The "さ"column include kana characters "さ,""し"(pronounced si), "す"(pronounced su), "せ"(pronounced se), and "そ"(pronounced so). The remaining "た"column, "な"column, "は"column, "ま"column, "や"column, "ら"column, and "わ"column include similarly arranged respective five kana characters. Five kana characters of a selected column are shown in a column on the display screen G. In the initial screen of FIG. 3A, a selection position (focus point) is placed on the kana character it "あ." The first row-level characters of "あ"column through "ま"column are displayed in a row and the member kana characters of the "あ"column, namely, "あ,""い,""う,""え,"and "お"are displayed in a column. In this way, the character line of the selected kana column is displayed to intersect the character line of the first row-level kana characters of the Japanese kana syllabary.

In the hard disk recorder of the first embodiment of the present invention, the selection position P is fixed on the display screen G. In other words, the selection position P remains fixed. To select another character, the display position of the displayed character is shifted.

Figure 3B:
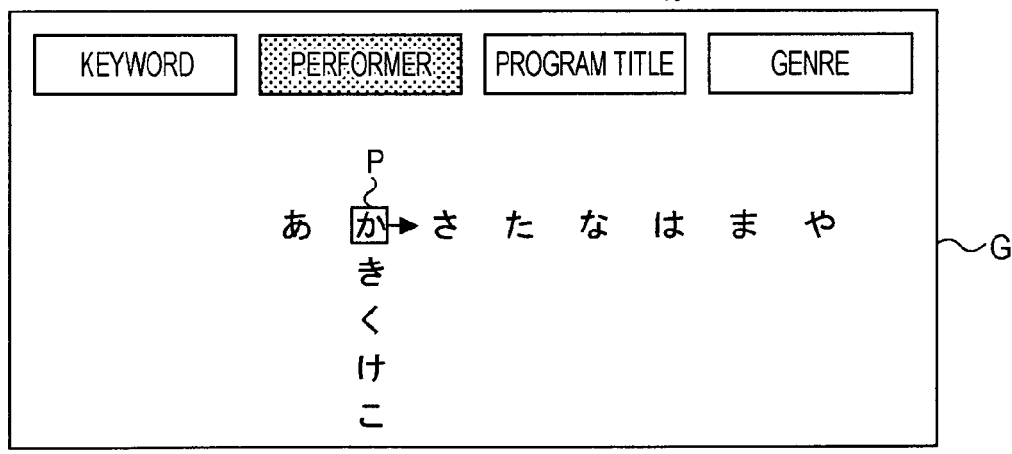

For example, the right key 176R of the cursor keys 176 on the remote controller 170 may be pressed in the state of FIG. 3A to move a selection character column rightward by one character as represented by an arrow in FIG. 3A. The controller 150 controls the display information generator 161 to shift the display position of the displayed character row leftward by one character as shown in FIG. 3B. In this case, the first row-level kana character " か "in the second kana column, namely, the " か "column of the Japanese kana syllabary is placed at the selection position P. As shown in FIG. 3B, the " か "column is selected. The character line of the five member kana characters of " か , " " き , " " く , " " け , "and " こ , "in the " か "column is displayed in a column to intersect the character line of the first row-level characters of the ten columns.

Figure 3C:
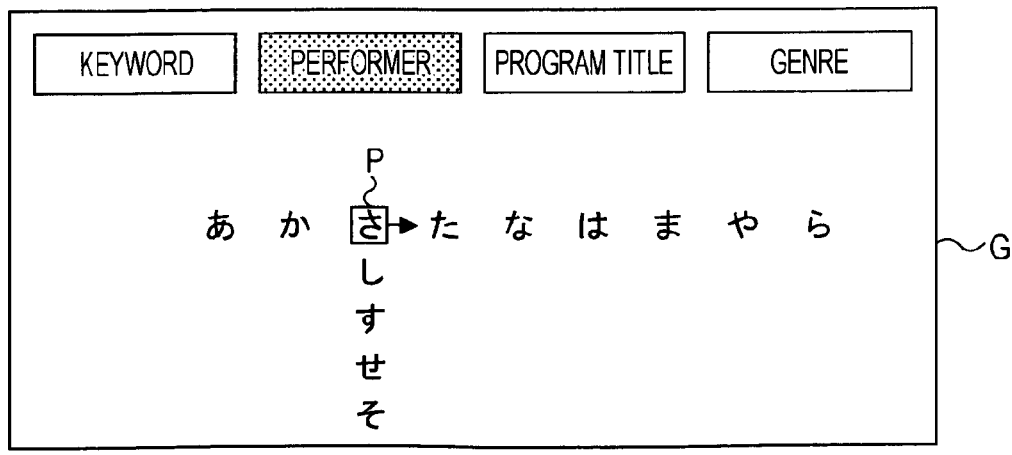

For example, the right key 176R of the cursor keys 176 on the remote controller 170 may be pressed in the state of FIG. 3B to move the selection character column rightward by one character as represented by an arrow in FIG. 3B. The controller 150 controls the display information generator 161 to shift the display position of the displayed character row leftward by one character as shown in FIG. 3C. In this case, the first row-level kana character " さ "of the third kana column, namely, " さ "column, of the Japanese kana syllabary is placed at the selection position P. As shown in FIG. 3C, the " さ "column is selected. The character line of the five member kana characters of " さ , " " し , " " す , " " せ , "and " そ , "in the " さ "column is displayed in a column to intersect the character line of the first row-level characters of the ten columns.

Figure 4A:
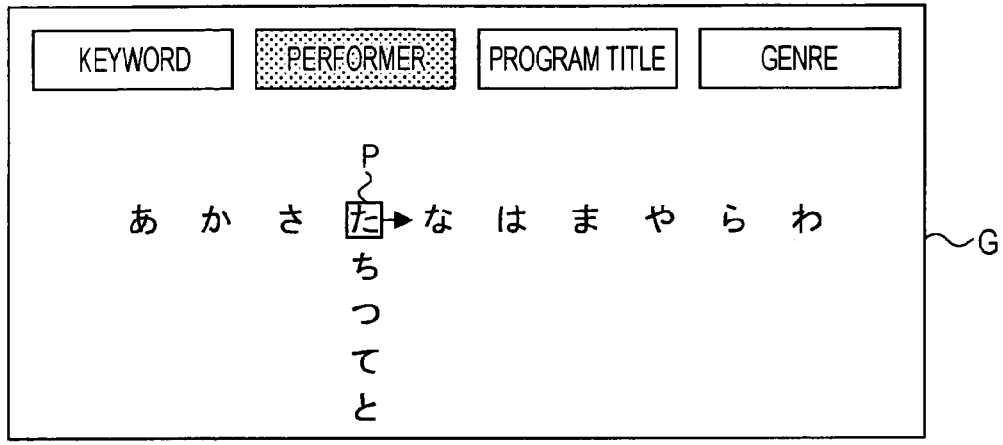
FIGS. 4A-4C illustrate a display example of inputting a specific keyword.

For example, the right key 176R of the cursor keys 176 on the remote controller 170 may be pressed in the state of FIG. 3C to move the selection character column rightward by one character as represented by an arrow in FIG. 3C. The controller 150 controls the display information generator 161 to shift the display position of the displayed character row leftward by one character as shown in FIG. 4A. In this case, the first row-level kana character " た "of the fourth kana column, namely, the " た "column of the Japanese kana syllabary is placed at the selection position P.

As shown in FIG. 4A, the " た "column is selected. The character line of the five member kana characters of " た , " " ち , " " つ , " " て , "and " と , "in the " た "column is displayed in a column to intersect the character line of the first row-level characters of the ten columns. As shown in FIG. 4A, the kana characters " あ "through " わ "are displayed in the row on the single screen.

Figure 4B:

For example, the right key 176R of the cursor keys 176 on the remote controller 170 may be pressed in the state of FIG. 4A to move the selection character column rightward by one character as represented by an arrow in FIG. 4A. The controller 150 controls the display information generator 161 to shift the display position of the displayed character row leftward by one character as shown in FIG. 4B. In this case, the first row-level kana character " な "of the fifth kana column, namely, the " な "column of the Japanese kana syllabary is placed at the selection position P.

As shown in FIG. 4B, the " な "column is selected. The character line of the five member kana characters of " な , " " に , " " ぬ , " " ね , "and " の , "in the " な "column is displayed in a column to intersect the character line of the first row-level characters of the ten columns. As shown in FIG. 4B, the displayed character row is shifted leftward by one character, and the kana character " あ "in the displayed row is not shown because of the size limitation of the display screen G.

Figure 4C:

For example, the right key 176R of the cursor keys 176 on the remote controller 170 may be pressed in the state of FIG. 4B to move the selection character row rightward by one character as represented by an arrow in FIG. 4B. The controller 150 controls the display information generator 161 to shift the display position of the displayed character row leftward by one character as shown in FIG. 4C. In this case, the first row-level kana character " は "of the sixth kana column of the Japanese kana syllabary is placed at the selection position P.

As shown in FIG. 4C, the " は "column is selected. The character line of the five member kana characters of " は , " " ひ , " " ふ , " " へ , "and " ほ , "in the " は "column is displayed in a column to intersect the character line of the first row-level characters of the ten columns. As shown in FIG. 4C, the displayed character row is shifted leftward by one character, and the characters " あ "and " か "are not shown because of the size limitation of the display screen G.

The selection column is shifted rightward one character by one character in this way. Finally, the " わ "column is placed at the selection position P. The first row-level kana characters of the " ま "column to the " わ "column are displayed to intersect the character line of the five member kana characters in the " わ "column. The last kana character " ん "(pronounced n) may be set to be as selectable as the last kana character in the final column subsequent to the " わ "column or may be set as selectable as a sixth member kana character in the " わ "column. The kana character " ん "is thus selectable in one of the two ways.

The selection column is shifted rightward one character by one character in the above discussion. Even if the selection column is shifted leftward one character by one character, the selection position P remains fixed. In such a case, a target column may be selected by shifting the display position of the characters rightward one character by one character.

Figure 5A:
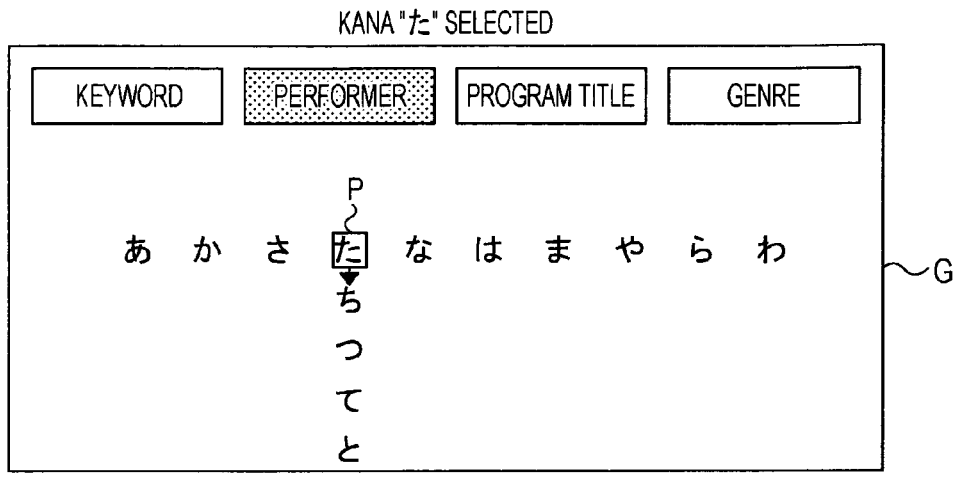
FIGS. 5A-5C illustrate a display example of inputting a specific keyword.
Figure 5B:
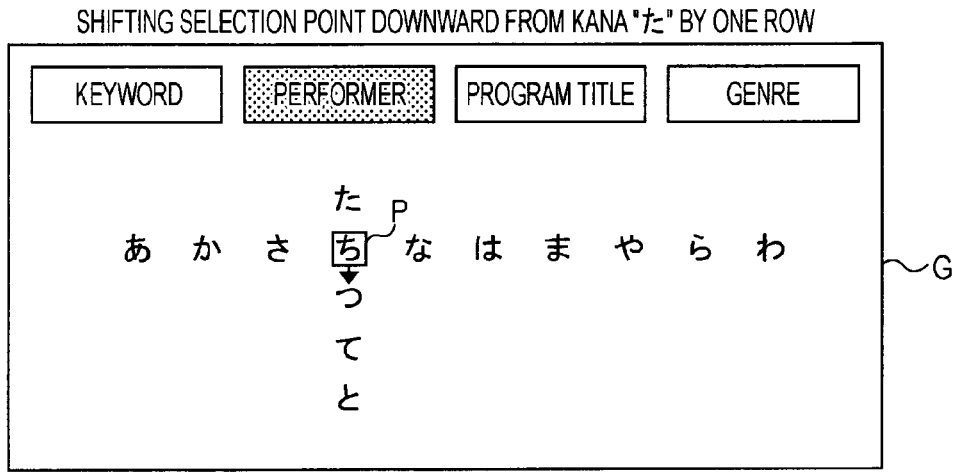

With the target column selected, a character at any row-level in the selected column may be selected. The " た "column may be selected as shown in FIG. 5A. For example, the down key 176D of the cursor keys 176 on the remote controller 170 may be pressed to move a selection row-level downward by one character as represented by an arrow in FIG. 5A. The controller 150 controls the display information generator 161 to shift the display position of the displayed character column upward by one character as shown in FIG. 5B. In this case, the kana character " ち "in the second row-level position in the " た "column is placed at the selection position P as shown in FIG. 5B.

Figure 5C:
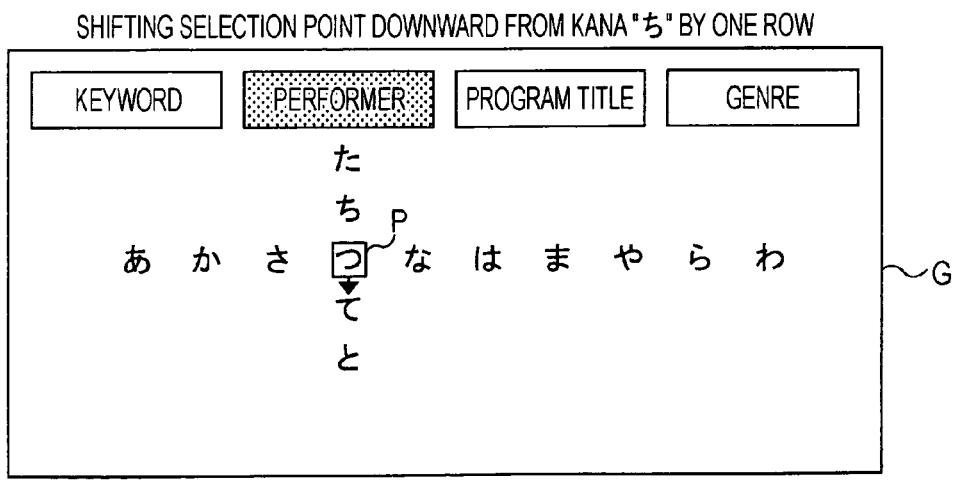

Similarly, with the kana character " ち "selected in the " た "column as shown in FIG. 5B, the down key 176D of the cursor keys 176 on the remote controller 170 may be pressed to move the selection row-level downward by one character as represented by an arrow in FIG. 5B. The controller 150 controls the display information generator 161 to shift the display position of the displayed character column upward by one character as shown in FIG. 5C. In this case, the kana character " つ "in the third row-level position in the " た "column is placed at the selection position P as shown in FIG. 5C.

Figure 6A:
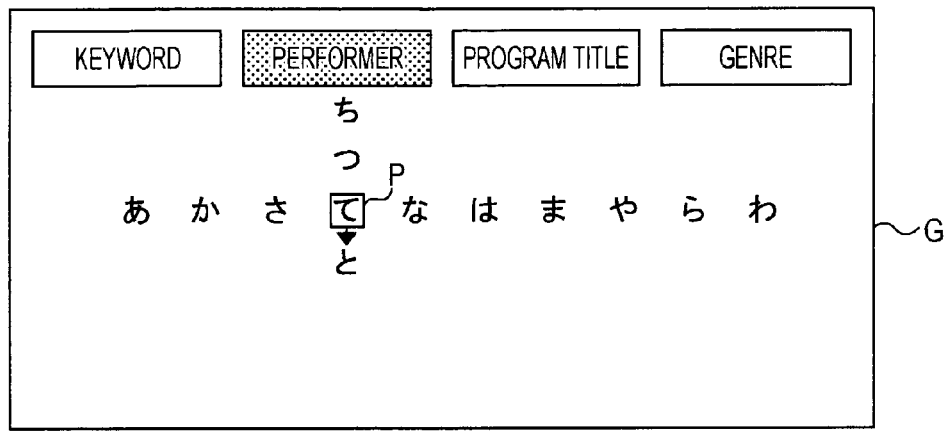
FIGS. 6A and 6B illustrate a display example of inputting a specific keyword.

Similarly, with the kana character " つ "selected in the " た "column as shown in FIG. 5C, the down key 176D of the cursor keys 176 on the remote controller 170 may be pressed to move the selection row-level downward by one character as represented by an arrow in FIG. 5C. The controller 150 controls the display information generator 161 to shift the display position of the displayed character column upward by one character as shown in FIG. 6A. In this case, the kana character " て "in the fourth row-level position in the " た "column is placed at the selection position P as shown in FIG. 6A.

Figure 6B:
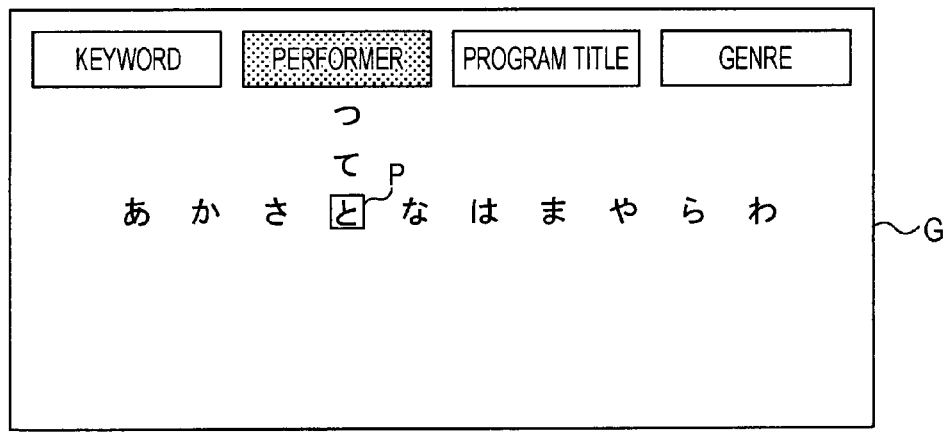

With the kana character " て "selected in the " た "column as shown in FIG. 6A, the down key 176D of the cursor keys 176 on the remote controller 170 may be pressed to move the selection row-level downward by one character as represented by an arrow in FIG. 6A. The controller 150 controls the display information generator 161 to shift the display position of the displayed character column upward by one character as shown in FIG. 6B. In this case, the kana character "と" in the fifth row-level in the "た" column is placed at the selection position P as shown in FIG. 6B.

Each character in the selected row-level is thus placed at the selection position P in this way.

The selection row-level is shifted downward by one character in the above discussion. Even if the selection row-level is shifted upward one character by one character, the selection position P may remain fixed. In such a case, a target row-level may be selected by shifting the display position of the characters downward one character by one character.

As described with reference to FIGS. 3A-3C through FIGS. 6A and 6B, each key of the cursor keys 176 on the remote controller 170 is pressed to place the target character at the selection position P. If the user then presses the enter key 176K on the remote controller 170, keyword candidates having as the leading character thereof the character placed at the selection position P are displayed. The keyword candidates having as the leading character thereof the selected character include a keyword of a type having exactly the selected kana character (written character) at the leading position thereof and a keyword of a type having a yomigana phonetically identical to the selected kana character at the leading position thereof (such as a kanji containing the same pronunciation as the selected kana character).

FIGS. 7A-7C and FIGS. 8A and 8B illustrate specific examples of the keyword candidates. By operating each of the cursor keys as described above, the kana character "つ" in the third row-level is selected in the "た" column as shown in FIG. 7A. If the enter key 176K of the cursor keys 176 is then pressed, the remote controller 170 controls the display information generator 161 to display a list of keyword candidates.

FIG. 7B illustrates a list of keyword candidates. As shown in FIG. 7B, the five member kana characters "た," "ち," "つ," "て," and "と" in the "た" column are indicated on the left end of the screen and then a cursor S is placed at the kana character "つ" to indicate that the kana character "つ" is currently selected. A selection mark MK is placed to the right of the selected kana character "つ."

A selection position PP is set to a candidate to the right of the selection mark MK. Keyword candidates are displayed above and below the candidate at the selection position PP. As shown in FIGS. 7A and 7B, the kana character "つ" (pronounced tu) is selected and entered as the leading character of the keywords. Keyword candidates having the kana character "つ" as the leading character thereof or the yomigana "つ" as the leading character are thus displayed.

According to the first embodiment of the present invention, performers' names are used as prepared keyword lists. As shown in FIG. 7B, keyword candidates displayed on a display window include "土田(pronounced tuchi-da) x x," "角川(pronounced tuno-kawa) YY," "角田(pronounced tuno-da) ZZ," "つの(pronounced tu-no-da) WW," and "津村(pronounced tu-mura) OO."

If the down key 176D of the cursor keys 176 on the remote controller 170 is pressed in this case, the controller 150 controls the display information generator 161 to scroll upward the keyword candidates row by row with the selection position PP unchanged with respect to the display screen G. The keyword candidate placed at the selection position PP is thus changed.

The display of the keyword candidates is scrolled upward one row by one row. If the up key 176U of the cursor keys 176 on the remote controller 170 is pressed, the display of the keyword candidates is scrolled downward row by row. The keyword candidate at the selection position PP is thus changed.

Figure 8A:
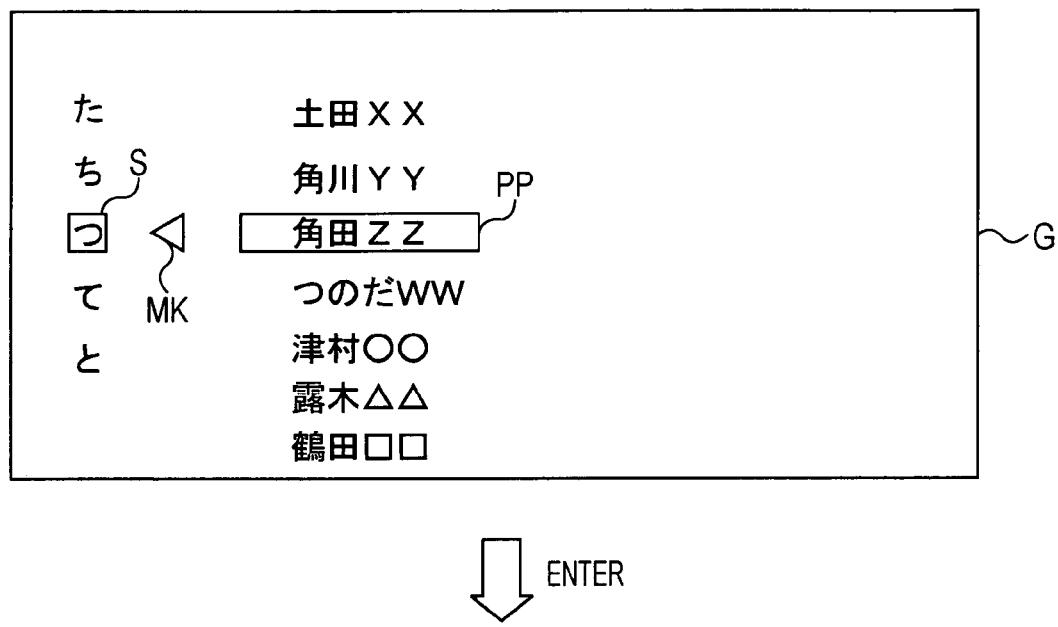
FIGS. 8A and 8B illustrate a display example of inputting a specific keyword.

As shown in FIG. 8A, the target keyword candidate "角田(pronounced tuno-da) ZZ" is placed at the selection position PP. If the enter key 176K of the cursor keys 176 on the remote controller 170 is then pressed, the controller 150 enters as a keyword "角田ZZ" placed at the selection position PP, and then performs an intended search process.

If an instruction to search the EPG data has been provided, the controller 150 searches the EPG data, as a search target, stored on the EEPROM 154 or the hard disk in the HDD 130 for information containing the keyword "角田ZZ." The controller 150 controls the display information generator 161 to generate display information based on information resulting from the search process.

Here in this case, the display information generator 161 displays, as search results, a list of broadcast programs on which "角田ZZ" appears. The user can specify and view a desired broadcast program from among the displayed list and set the desired broadcast program for programmed-recording.

If an instruction to search for the index information of the content data recorded on the hard disk in the HDD 130 has been provided, the controller 150 sets as the search target the index information of the content data stored on the hard disk in the HDD 130. The controller 150 searches for information containing the keyword "角田ZZ." The controller 150 controls the display information generator 161 to generate display information based on information resulting from the search process.

Figure 8B:
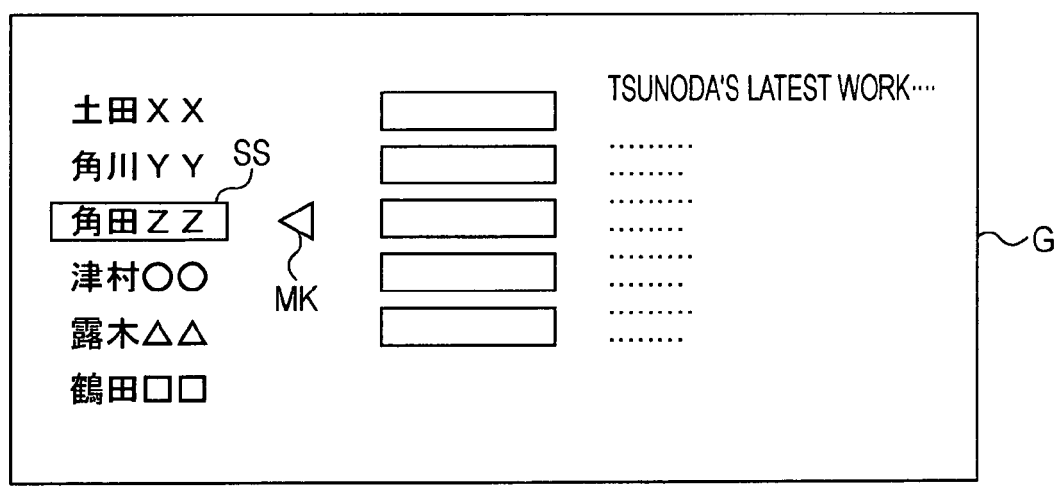

In this case as well, the display information generator 161 displays a list of recorded content data on which "角田ZZ" appears as shown in FIG. 8B. The user may specify desired content out of the content data, and play and view the specified content.

Figure 9:
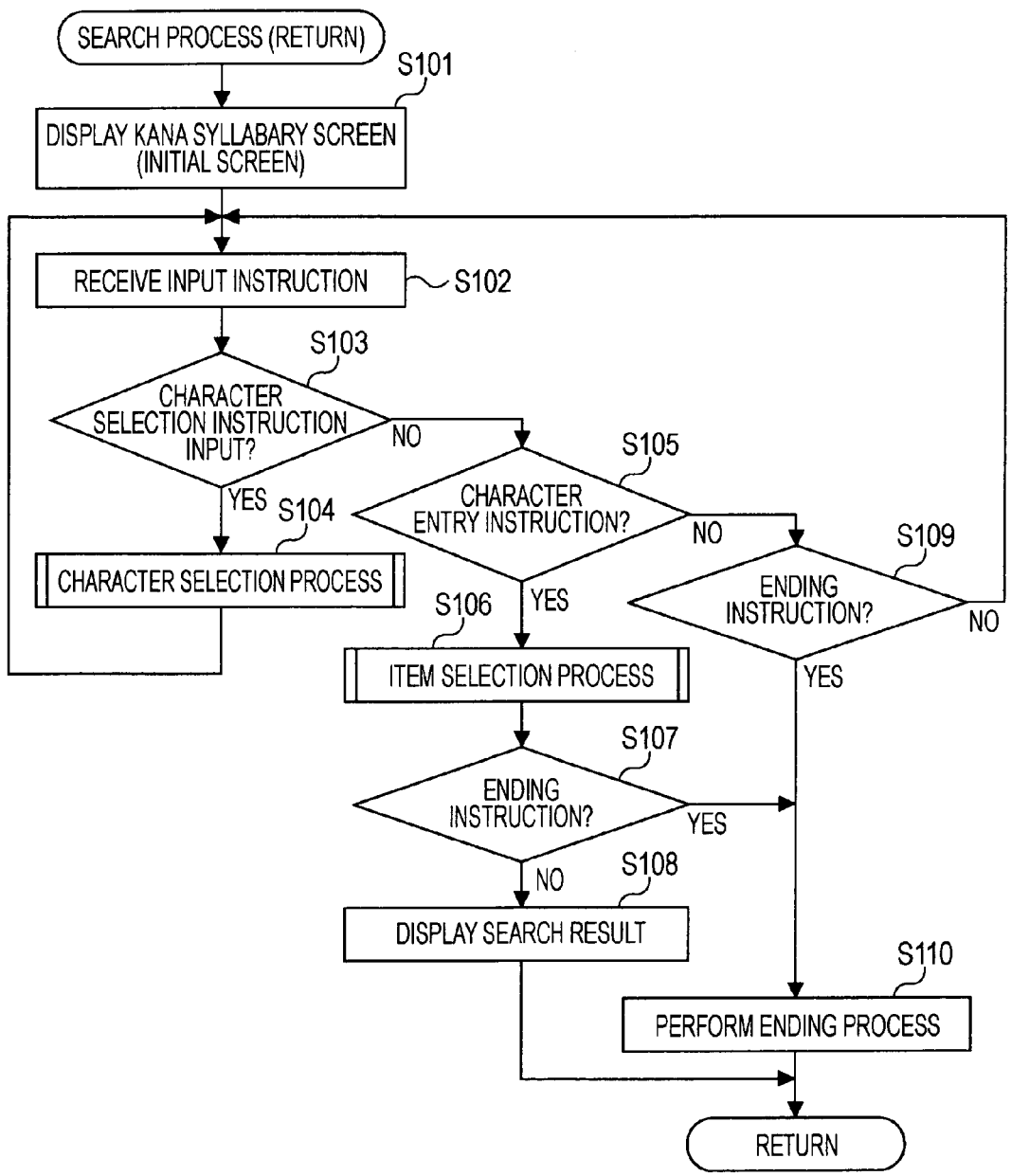
FIG. 9 is a flowchart illustrating a search process to input a keyword.
Figure 10:
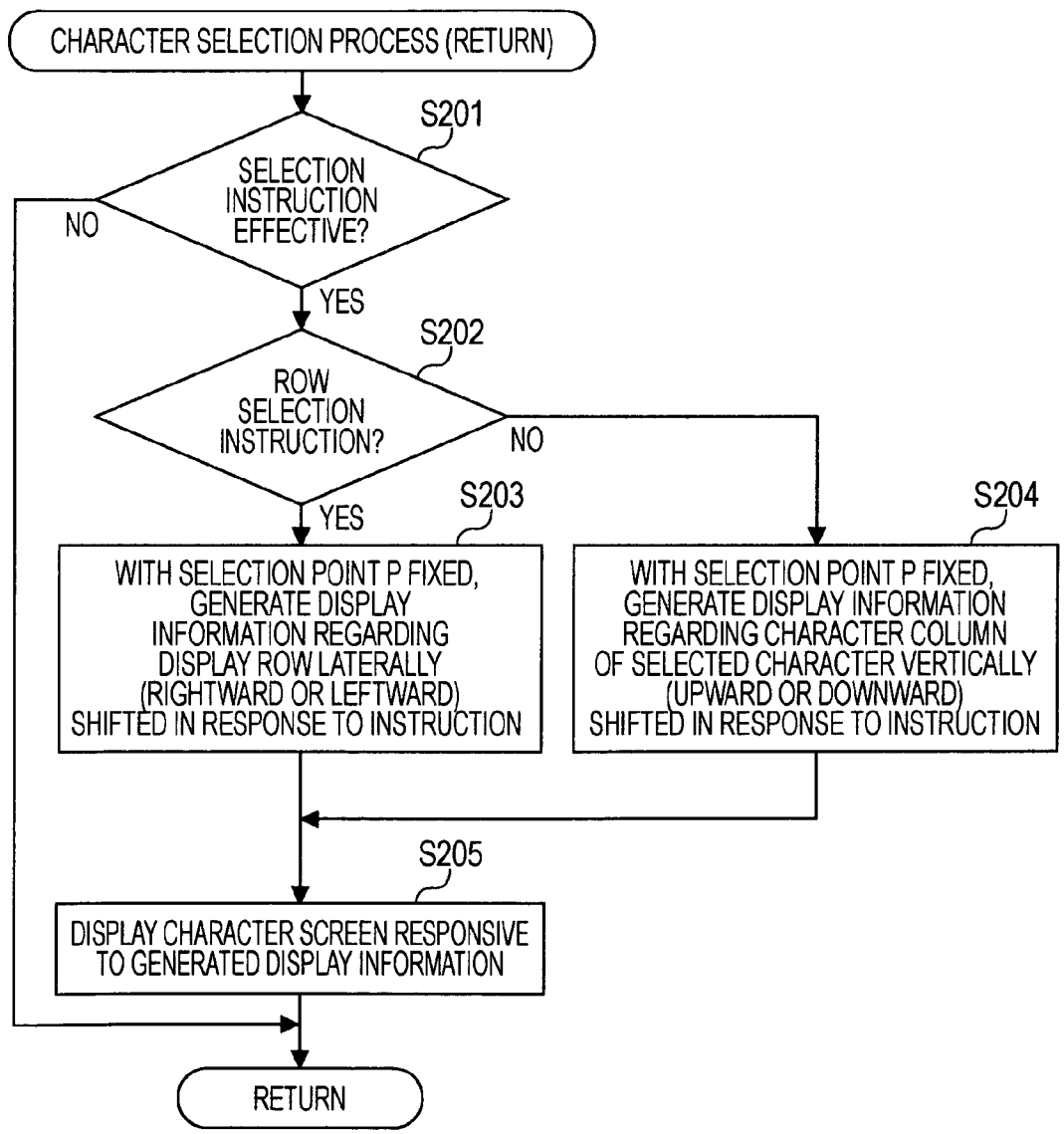
FIG. 10 is a flowchart illustrating a character selection process performed in step S104 in the search process of FIG. 9.
Figure 11:
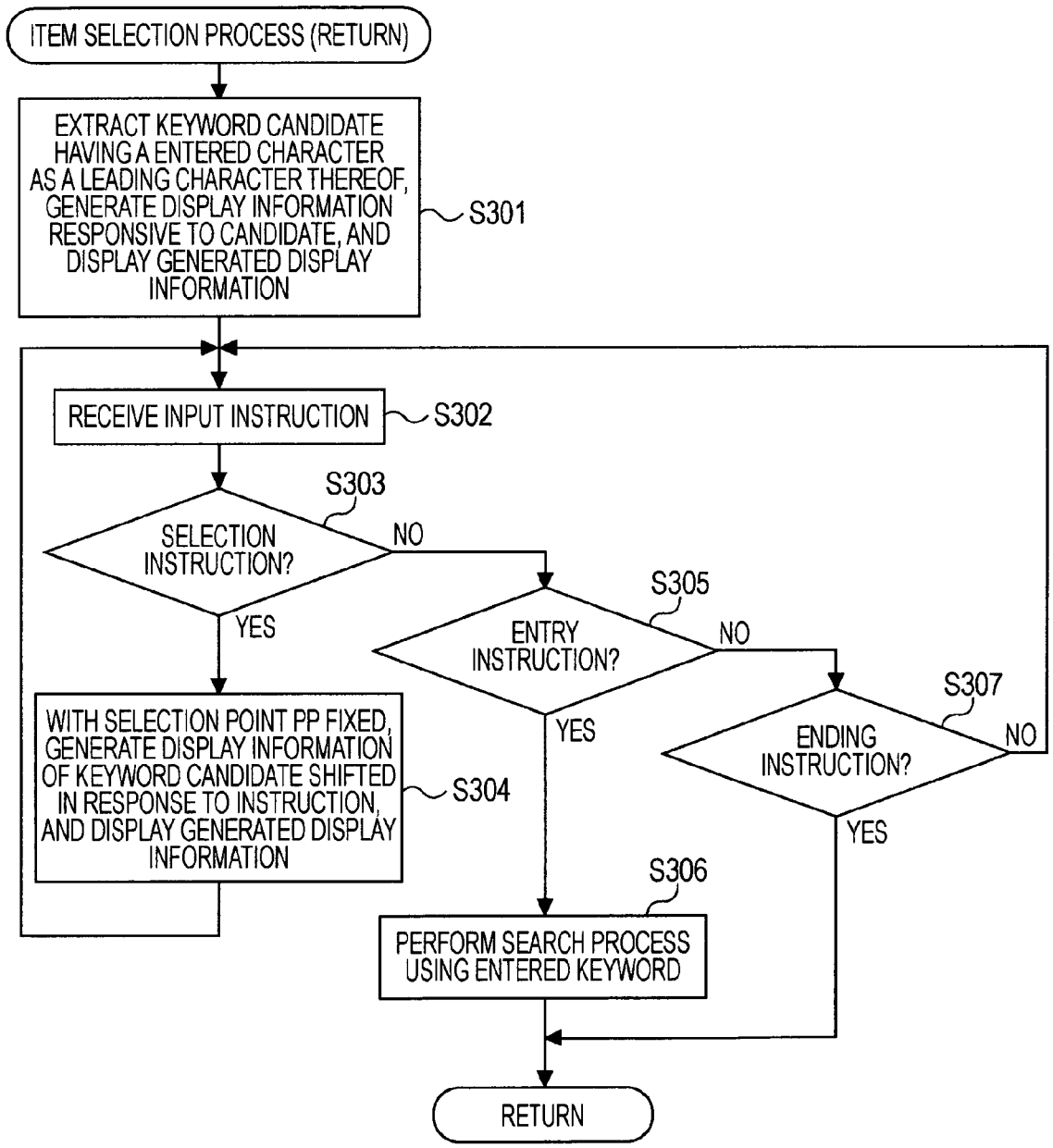
FIG. 11 is a flowchart illustrating an item selection process performed in step S106 of the search process of FIG. 9.

The keyword input processes discussed with reference to FIGS. 3A-3C through FIGS. 8A and 8B are described below with reference to flowcharts of FIGS. 9-11. FIG. 9 is a flowchart illustrating a search process in which keyword inputting is performed. FIG. 10 illustrates a character selection process performed in step S104 of the search process of FIG. 9. FIG. 11 is a flowchart illustrating an item selection process performed in step S106 of the search process of FIG. 9.

When the menu key of the function keys 177 on the remote controller 170 is pressed in the hard disk recorder of the first embodiment of the present invention, the controller 150 and the display information generator 161 display a list of executable functions as previously discussed. The list is then supplied to the video synthesizer 126. The list is then displayed on the display screen of the monitor display connected to the hard disk recorder of the first embodiment of the present invention.

With an operation key of the cursor keys 176 on the remote controller 170 pressed, one of the item "search in EPG data" and the item "search for index information of stored data" may be selected and a keyword attribute, namely, one of the selection items k1-k4 may be selected as shown in FIG. 3A. The controller 150 then performs the search process of FIG. 9. As described with reference to FIG. 3A, the selection item k2 may be selected and the "performer" name may be used as a search keyword.

The controller 150 controls the display information generator 161 to generate the display information for the initial screen on a Japanese kana syllabary selection screen receiving a target keyword input. The display information is then supplied to the video synthesizer 126. The Japanese kana syllabary selection screen (initial screen) of FIG. 3A is thus displayed on the screen of the monitor display connected to the hard disk recorder of the first embodiment of the present invention (step S101).

The controller 150 receives an instruction from the user via the remote controller 170 (step S102). The controller 150 determines whether the user instruction input received in step S102 is a character selection input responsive to the pressing of one of the right key 176R, the left key 176L, the up key 176U, and the down key 176D of the cursor keys 176 (step S103).

If it is determined in step S103 that the received instruction input is a character selection instruction, the controller 150 performs the character selection process to be discussed later (step S104). Subsequent to step S104, processing returns to step S102. If it is determined in step S103 that the received instruction input is not a character selection instruction, the controller 150 determines whether the received instruction input is a character entry instruction (step S105).

If it is determined in step S105 that the received instruction input is a character entry instruction, the controller 150 performs an item selection process to be discussed later (step S106). The controller 150 determines in step S106 whether an ending instruction is received (step S107). If it is determined that no ending instruction is received, the controller 150 displays information (search results) resulting from the search performed in step S106 (step S108). The process of FIG. 9 thus ends.

If it is determined in step S107 that an ending instruction is received in step S106, no further search process is performed. The process of FIG. 9 is completed after an ending process is performed in step S110.

If it is determined in step S105 that the received instruction input is not a character entry instruction, the controller 150 determines whether the received instruction input is an ending instruction (step S109). If it is determined in step S109 that the received instruction input is an ending instruction, the controller 150 performs a predetermined ending process such as erasing the Japanese kana syllabary selection screen currently displayed (step S110). The process of FIG. 9 thus ends. If it is determined in step S109 that the received instruction input is not an ending instruction, processing returns to step S102 to repeat step S102 and subsequent steps. The user instruction input is then repeatedly received.

The leading character of the keyword is selected in the character selection process in step S104 in this way. The character selection process will be described in more detail. The search process is performed using an item (keyword) selected in the item selection process performed in step S106 from among the keyword candidates identified by the leading character. This process will also be described in more detail. Search results are display in step S108.

The character selection process performed in step S104 of FIG. 9 is described below with reference to FIG. 10. In the character selection process, the controller 150 determines whether a character selection instruction received in step S102 is effective (step S201). In other words, based on a character placed at the selection position P prior to character selection, the controller 150 determines in step S201 whether a character placed at the selection position P is present subsequent to the character selection.

As shown in FIG. 3A, the kana character "あ" may be placed at the selection position P, for example. Even if the left key 176L is pressed, or even if the up key 176U is pressed, such an operation is determined as being ineffective, because no column is present to the left of the "あ" column, and no other kana characters are present above the kana character "あ"

If it is determined in step S201 that the received character selection instruction is ineffective, the controller 150 skips the process of FIG. 10 and returns to the process of FIG. 9 to start at step S102. The instruction is thus repeatedly received.

If it is determined in step S201 that the received character selection instruction is effective, the controller 150 determines whether the received character selection instruction is to select row, i.e., determines whether the received character selection instruction has been issued in response to pressing of right key 176R or the left key 176L on the remote controller 170 (step S202).

If it is determined in step S202 that the received character selection instruction is a row selection instruction, the controller 150 controls the display information generator 161 to generate the display information for moving the displayed row laterally (rightward or leftward) in response to the user instruction without changing the selection position P (step S203).

If it is determined in step S202 that the received character selection instruction is not a row selection instruction, the controller 150 determines that the received character selection instruction is a row-level selection instruction in the column, i.e., determines that the received character selection instruction has been issued in response to pressing of one of the up key 176U and the down key 176D of the remote controller 170. The controller 150 controls the display information generator 161 to scroll (upward or downward) a character column composed of the characters in the column selected by the user without changing the selection position P (step S204).

Subsequent to one of steps S203 and S204, the controller 150 controls the display information generator 161 to supply the generated display information to the video synthesizer 126. A text image responsive to the generated display information is displayed on the display screen of the monitor display connected to the hard disk recorder (step S205). The process of FIG. 10 thus ends.

The process of FIG. 10 is the process that is performed to select a target character from the Japanese kana syllabary two-dimensionally arranged of rows and columns as discussed with reference to FIGS. 3A-3C through FIGS. 6A and 6B. The leading character of the target keyword is selected in this way.

The item (keyword) selection process performed in step S106 of FIG. 9 is described below. FIG. 11 is a flowchart illustrating the item selection process performed in step S106 of FIG. 9.

As previously discussed, the item selection process of FIG. 11 is performed in step S106 of FIG. 9 when the target character is selected in step S104 of FIG. 9 followed by the pressing of the enter key 176K on the remote controller 170 in step S102 of FIG. 9.

In such a case, the controller 150 first extracts a keyword candidate having as the leading character thereof the selected and entered character, out of a prepared list of corresponding keywords. The controller 150 controls the display information generator 161 to generate the display information for displaying the list of keyword candidates and supplies the generated display information to the video synthesizer 126. A display image responsive to the display information is thus displayed on the display screen of the monitor display connected to the hard disk recorder (step S301).

The process of step S301 is a process of displaying the list of keyword candidates, each having the entered character at the leading position thereof, from the prepared list of the performers, names if the "performer" is selected as the attribute of keyword information as previously discussed with reference to FIG. 7B. The keyword candidates having the entered character at the leading position thereof include a keyword having the written entered character at the leading position thereof and a keyword having a yomigana phonetically identical to the entered character at the leading position thereof.

The controller 150 receives an instruction input from the user via the remote controller 170 (step S302). The controller 150 determines whether the received instruction input is a keyword candidate selection instruction, i.e., determines whether the instruction input received via the remote controller 170 is issued in response to pressing of one of the up key 176U and the down key 176D (step S303).

If it is determined in step S303 that the received instruction input is a keyword candidate selection instruction, the controller 150 controls the display information generator 161 to generate display information for scrolling a keyword candidate in response to the user instruction with the selection position PP fixed. The controller 150 supplies the display information to the video synthesizer 126, thereby displaying a display image responsive to the display information on the display screen of the monitor display connected to the hard disk recorder (step S304).

The series of steps S302-S304 corresponds to the process of selecting keyword candidates in response to the user instruction input as previously discussed with reference to FIGS. 7B, 7C and 8A.

If it is determined in step S303 that the received instruction input is not a keyword candidate selection instruction, the controller 150 determines whether the received instruction input is a keyword entry instruction (step S305). The determination process in step S305 corresponds to the process of determining whether the enter key 176K is pressed on the remote controller 170 with the target keyword candidate at the selection position PP of the keyword candidates as shown in FIG. 8A.

If it is determined in step S305 that the received instruction input is a keyword entry instruction, the controller 150 enters as the target keyword the keyword candidate at the selection position PP of the keyword candidates. The controller 150 then searches for corresponding information using the entered keyword (step S306).

The process in step S306 corresponds to the process of searching for information containing the entered keyword by searching the EPG data if the user issues the instruction of "search in EPG data." If the user issues the instruction "search for index information of stored data," the process in step S306 corresponds to the process of searching for the information containing the entered keyword by searching the index information of the content data stored on the hard disk.

The controller 150 completes the process of FIG. 11 subsequent to step S306, and then returns to step S107 of FIG. 9. In step S107 of FIG. 9, the controller 150 displays the information of search results on the display screen of the monitor display connected to the hard disk recorder as shown in FIG. 8B.

If it is determined in step S305 that the received instruction input is not a keyword entry instruction, the controller 150 determines whether the received instruction input is an ending instruction (step S307). If it is determined in step S307 that the received instruction input is an ending instruction, the controller 150 completes the process of FIG. 11 without searching using the keyword. Processing thus returns to the process of FIG. 9.

If it is determined in step S307 that the received instruction input is not an ending instruction, the controller 150 returns to step S302 to receive a user instruction input.

In response to the user instruction, the hard disk recorder determines the target keyword from among the keyword candidates, searches for the information in accordance with the keyword, and uses the search results in the process of FIG. 9 in order to display the search results to the user. In response to the reception of the ending instruction, the hard disk recorder ends the process of FIG. 11 without searching.

The hard disk recorder of the first embodiment of the present invention displays the character line, composed of the first row-level kana characters of the character columns, in a horizontal direction, and the character line of the kana characters of the character column including the selected kana character, in a vertical direction. The hard disk recorder thus allows the user to select and enter the target character with a minimum amount of information displayed on the screen thereof.

The character selection is easily performed using limited number of cursor keys 176, including the right key 176R, the left key 176L, the up key 176U, the down key 176D, and the enter key 176K. Since the selection positions of the character and the keyword are fixed to the display screen, the user is freed from moving the eyes' view point.

The user can select quickly the target character and the keyword in a simple operation, and performs the search process using the selected keyword. If keywords in use are limited, it is not necessary to input all the keyword. By entering merely a part of the characters of the keyword, the target keyword can be selected, and the search process using the target keyword can be performed.

In the character selection process in the two-dimensionally arranged Japanese kana syllabary, the target character column is selected from the kana character columns, and the target kana character is selected from the selected character row-level as described above. To undo the character selection, several modes are available to select flexibly the character.

FIGS. 12A-12C through FIGS. 14A and 14B illustrate screen display examples in which a selected character is modified in the two-dimensionally arranged Japanese kana syllabary. In FIGS. 12A-12C through FIGS. 14A and 14B, a character selected (at the selection position) is changed from the kana character " ち " to the kana character " し. "

A first example is described with reference to FIGS. 12A-12C. In the first example, the character column is changed after returning to the first row-level character of the character column containing the selected character. As shown in FIG. 12A, with the kana character " ち "at the selection position P, the kana character " し "is placed to the selection position P. By pressing the up key 176U as represented by an arrow in FIG. 12A, the user can place at the selection position P the kana character " た "as the first row-level kana character of the kana character " た "column as shown in FIG. 12B.

By pressing the left key 176L as represented by an arrow in FIG. 12B, the user can place at the selection position P the kana character " さ "as the first row-level kana character of the character " さ "column as shown in FIG. 12C. Then by pressing the down key 176D as represented by an arrow in FIG. 12C, the kana character " し "in the character " さ "column is placed at the selection position P.

In the first example of FIGS. 12A-12C, a three-step operation of using (1) up key 176U→(2) left key 176L→(3) down key 176D is performed to transition from the state with the kana character " ち "selected to the state with the kana character " し "selected.

A second example is described with reference to FIGS. 13A-13C. In the second example, the character column is changed without returning to the first row-level character of the character column containing the selected kana character. As shown in FIG. 13A, with the kana character "ち" at the selection position P, the kana character "し" is shifted to the selection position P. By pressing the left key 176L as represented by an arrow in FIG. 13A, the user can place at the selection position P the kana character "さ" as the first row-level kana character of the kana character "さ" column as shown in FIG. 13B.

In the second example as well as in the first example, the character line of the first row-level kana characters of the kana character columns is displayed to intersect the member kana characters of the character column containing the selected kana character. If the left key 176L is pressed in this case, the kana character "さ" of the character "さ" column displayed to the left of the kana character "た" is placed at the selection position P.

Since the relative position of the selection position P on the display screen remains fixed, the kana character "さ" of the character "さ" column is placed at the selection position P. By pressing the down key 176D as represented by an arrow in FIG. 13B, the user can place at the selection position P the kana character "し" of the character "さ" column as shown in FIG. 13C.

In the second example of FIGS. 13A-13C, a two-step operation of using (1) left key 176L→(2) down key 176D is performed to transition from the state with the kana character "ち" selected to the state with the kana character "し" selected.

A third example is described below with reference to FIGS. 14A and 14B. The third example is different from the first and second examples in that the character line in a horizontal direction intersecting the character line of the member kana characters of the character column containing the selected kana character includes kana characters at the same row-level positions across the character columns.

Figure 14A:
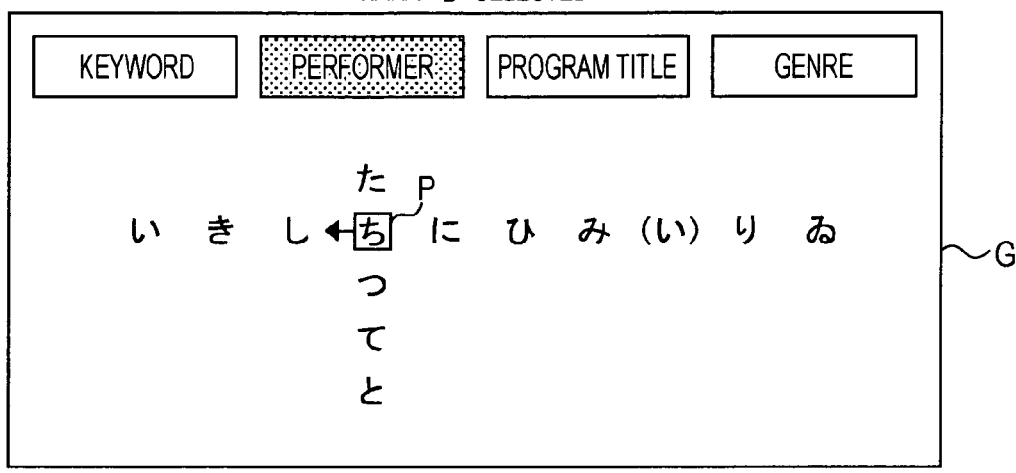
FIGS. 14A and 14B illustrate a display example in which a character selected is changed in the two-dimensionally arranged Japanese kana syllabary.

More specifically, as shown in FIG. 14A, the kana character "ち" is now placed at the selection position P. The character line of kana characters "た," "そ," "つ," "て," and "と" in the character "た" column is displayed to intersect second row-level characters of the character columns, namely, kana characters "い"(pronounced i), "き"(pronounced ki), "し"(pronounced si), "ち"(pronounced ti), "た"(pronounced ni), "ひ"(pronounced hi), "み"(pronounced mi), ("い"), "り"(pronounced ri), and "ゐ"(pronounced i). In the third example as well as in the second example, the kana column changing is performed without returning to the first row-level character of the column containing the selected character.

As shown in FIG. 14A, the user may wish to place the kana character "し" at the selection position P. By pressing the left key 176L as shown in FIG. 14A, the user can place the kana character "し" at the selection position P as shown in FIG. 14B.

Figure 14B:
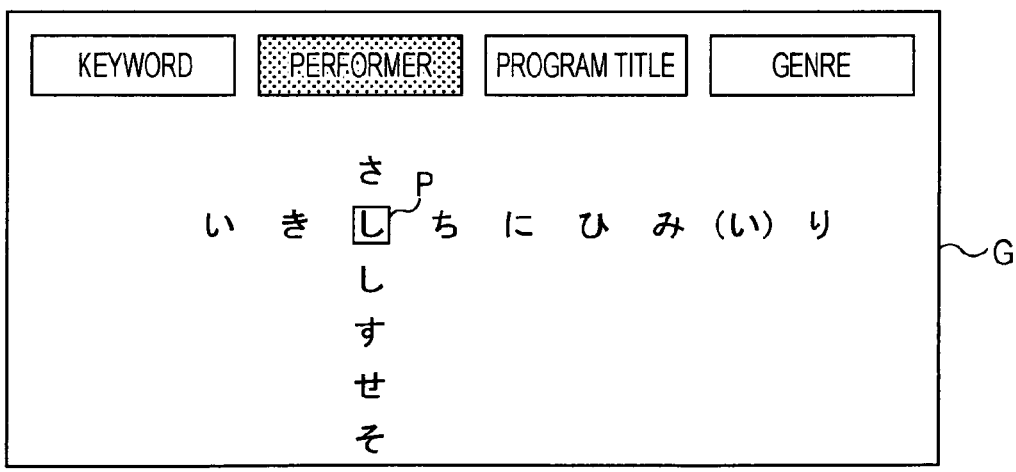

To select a kana character at a different column in the third example of FIGS. 14A and 14B, vertical shifting is not performed as long as the desired kana character is at the same row-level. More specifically, a mere pressing of (1) left key 176L places the target kana character "し" at the selection position P.

If a character to be selected is far apart from a currently selected character, the number of pressings of the cursor keys 176 increases accordingly. Regardless of the row-level of a target character, the use of lateral shifting of the characters sets the number of pressing operations to be smaller in the second example than in the first example, and smaller in the third example than in the first example.

Second Embodiment

A hard disk recorder of a second embodiment of the present invention is described below. The hard disk recorder of the first embodiment of the present invention searches for the target information by searching for the target text information candidates from among a large number of text information candidates stored.

The hard disk recorder of the second embodiment of the present invention inputs the target information by searching for the target text information candidates from among a large number of text information candidates stored.

The hard disk recorder of the second embodiment of the present invention is identical in structure to the hard disk recorder of the first embodiment of the present invention. The hard disk recorder of the second embodiment of the present invention is described with reference to FIGS. 1 and 2, which have been referred to in the discussion of the first embodiment of the present invention.

As previously discussed with reference to FIG. 1, the hard disk recorder of the second embodiment of the present invention includes the digital input-output terminal 101 and the digital interface 102. The hard disk recorder of the second embodiment of the present invention receives still image data or moving image data from one of the digital still camera and the digital video camera, and stores the still image data or the moving image data on the hard disk in the HDD 130.

The hard disk recorder then attaches tag information to the still image data or the moving image data stored on the hard disk in the HDD 130 in response to a user instruction input.

More specifically, when the tag information is input as the text information, the Japanese kana syllabary is two-dimensionally arranged in the same manner as in the hard disk recorder of the first embodiment of the present invention. Displayed are only a vertical character line of kana characters in a selected kana column and a horizontal character line of first row-level characters of the kana columns with the two lines intersecting each other, out of the Japanese kana syllabary. In this way, a leading character of text information to be input is specified.

The dictionary data in the dictionary data memory 162 is used in accordance with the leading character of the specified text information to be input. A list of text information candidates to be input is displayed. Target text information is selected from the list, and the selected text information is then input as the tag information.

An input process of the tag information is described below. When the menu key in the function keys 177 is pressed on the remote controller 170 in the hard disk recorder of the second embodiment of the present invention, the controller 150 controls the display information generator 161 to generate display information for displaying a list of processes executable by the hard disk recorder of the second embodiment of the present invention. The display information is then supplied to the video synthesizer 126. The list is then displayed on the display screen of the monitor display connected to the hard disk recorder of the second embodiment of the present invention.

The user presses operation keys in the cursor keys 176 on the remote controller 170 to place a cursor onto an item "attach tag information to stored data" from the displayed list of executable processes to select that item. When the user then presses the enter key 176K, the controller 150 controls the display information generator 161 to generate an input processing screen of the tag information and displays the tag information on the display screen of the monitor display connected to the hard disk recorder of the second embodiment of the present invention.

Figure 15:
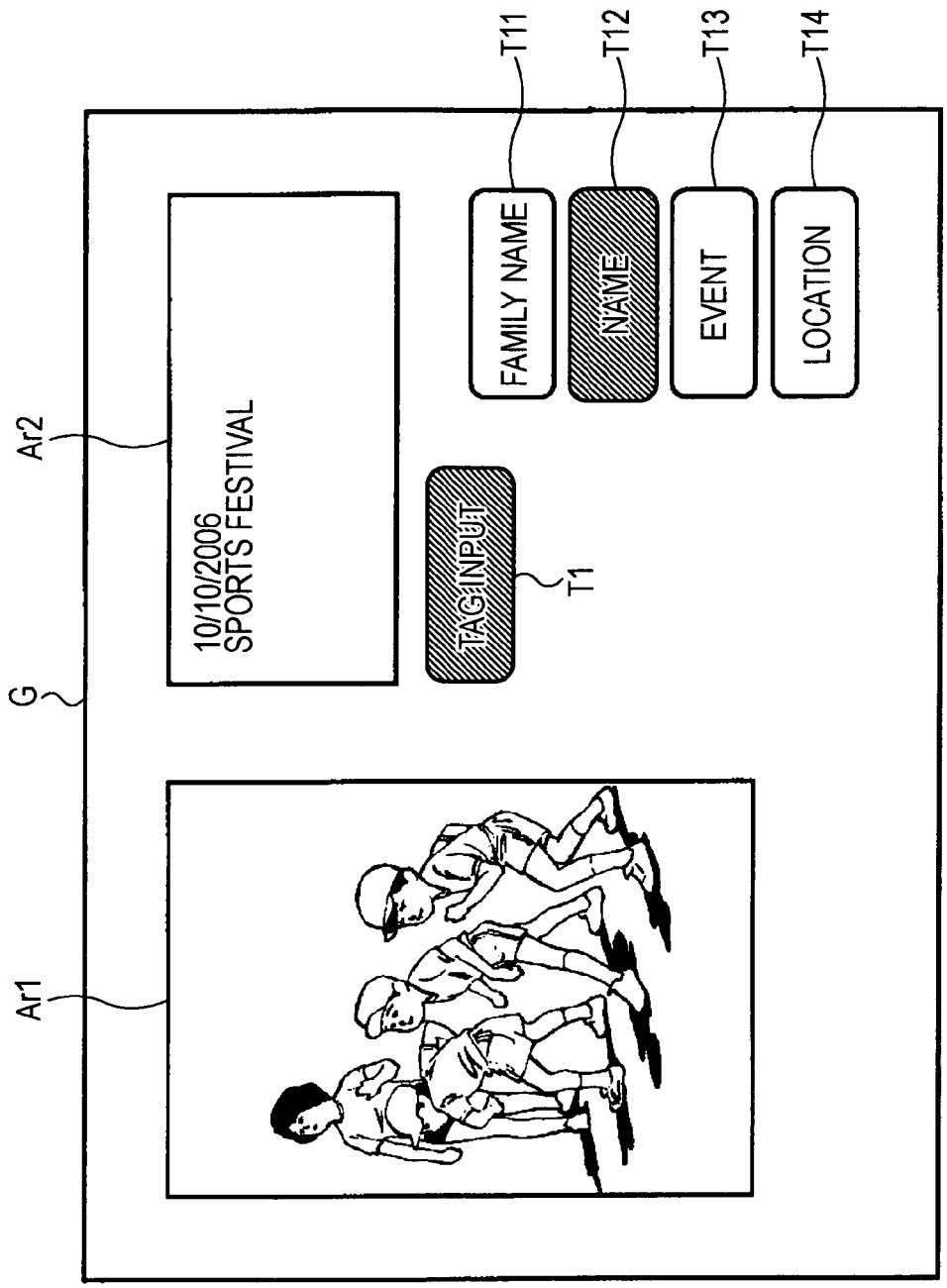
FIG. 15 illustrates an input processing screen of tag information in which the tag information is input.

FIG. 15 illustrates the input processing screen of the tag information used when the tag information is attached to the still image data or the moving image data stored on the hard disk in the HDD 130 in the hard disk recorder of the second embodiment of the present invention. The input processing screen shows a display screen G of the monitor display and includes a target image display area Ar1 and an input tag display area Ar2. The target image display area Ar1 shows an image to which the tag information is attached. The input tag display area Ar2 shows the tag information attached to the image.

The target image display area Ar1 displays an image that the user has selected from images stored on the hard disk in the HDD 130 using the remote controller 170. To select the image, the user may perform a predetermined operation to display on a sub-window a list of image data stored on the hard disk, and then select a desired image from the list. In the case of FIG. 15, an image of children's sports festival is selected and displayed.

The input tag display area Ar2 shows the tag information attached to the image displayed in the target image display area Ar1 and newly input tag information. As illustrated in FIG. 15, the input tag display area Ar2 shows information, indicating photograph date, month, and year and a previously input event name "sports festival," attached as the tag information to image data in the camera having captured the image.

Displayed below the target image display area Ar1 are a process display T1 indicating that the input process of the tag information is in progress, and tag attribute selection items T11, T12, T13, and T14 for selecting which tag information to input. In this case, four types of information, "family name," "name," "event," and "location," as tag information are input by selecting from prepared text information candidates.

The "family name" is used to input the surname of a person's name as the tag information. The "name" is used to input the individual name of the person's name as the tag information. The "event" is used to input, as the tag information, event names, such as "sports festival," "birthday," "travel," each related to a subject image. The "location" is used to input, as the tag information, geographical names, such as "Yoyogi," "Harajuku," "Shibuya," etc.

As shown in FIG. 15, the target image display area Arm shows an image of a children's sports festival and the photograph date, month and year and the event name are attached as the tag information to the image. Text information of a child's name " 恒 明 "(being two kanji characters and phonetically expressed by yomiganas (kanas) ねあき "(pronounced tune-aki)) is now attached as the tag information to the image.

As shown in FIG. 15, the tag attribute selection item T12 is selected, and the inputting of the "name" is selected. In the hard disk recorder of the second embodiment of the present invention, the controller 150 controls the display information generator 161 to display an input screen of the tag information and then receives input tag information.

Figure 16A:
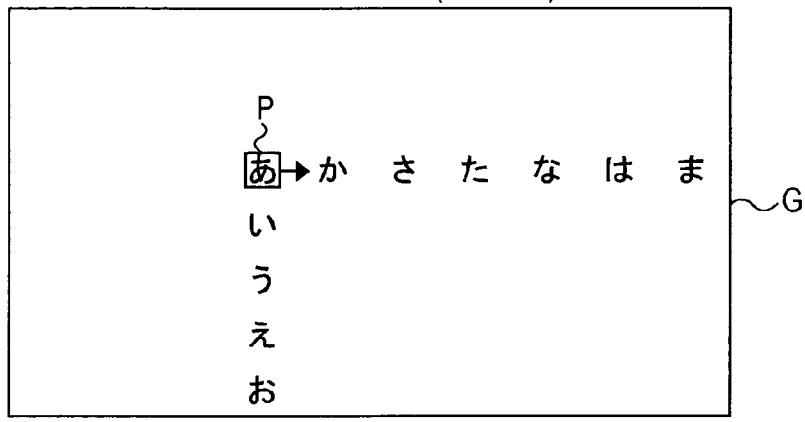
FIGS. 16A-16C illustrate a display screen in which a name " 恒 明 "(pronounced tune-aki) is input as the tag information.

FIGS. 16A-16C through FIGS. 20A and 20B illustrate the display screens that receive the child's name " 恒 明 "as the tag information. The controller 150 controls the display information generator 161 to generate display information for displaying an initial screen receiving the input of the name and to display the display information as shown in FIG. 16A.

In the initial screen of FIG. 16A, the first row-level kana characters of the kana columns of " あ "column to " わ "column, of the Japanese kana syllabary, are displayed in a horizontal direction on the display screen G. The five member kana characters belonging to the selected kana column are displayed in a vertical direction on the display screen G. Since FIG. 16A illustrates the initial screen, the kana character " あ "is placed at the selection position (focus point) P, the character line of the first row-level characters of the column " あ "to the column " わ "and the character line of the " あ "column, namely, " あ ," " い ," " う ," " え ," and " お "are displayed. More specifically, the character line of the kana characters in the selected column are displayed to intersect the character line of the first row-level characters of the columns in the Japanese kana syllabary.

Figure 16B:
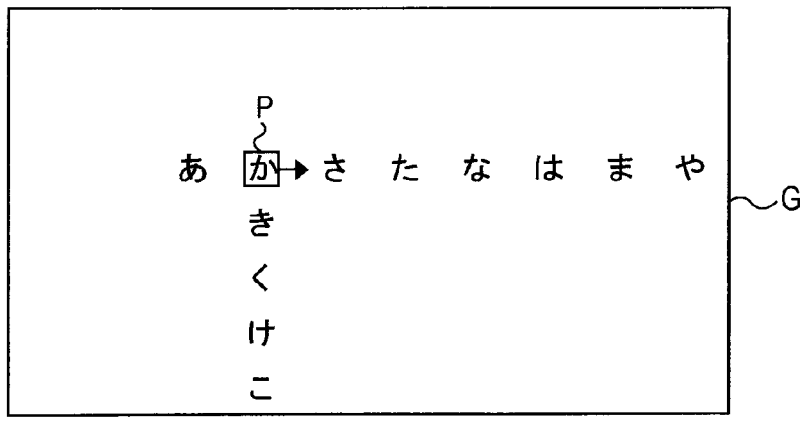

Since the leading character of the child's name " 恒 明 "is phonetically the kana character " つ ," the third row-level character " つ "of the " た "column is selected. More specifically, the user may press the right key 176R on the remote controller 170 as shown in FIG. 16A. The controller 150 controls the display information generator 161 to generate display information for displaying the first row-level character " か "of the " か "column at the selection position P. The display information is then supplied to the video synthesizer 126. As illustrated in FIG. 16B, an image with the first row-level kana character " か "of the " か "column is displayed on the display screen of the monitor display connected to the hard disk recorder of the second embodiment of the present invention.

Figure 16C:
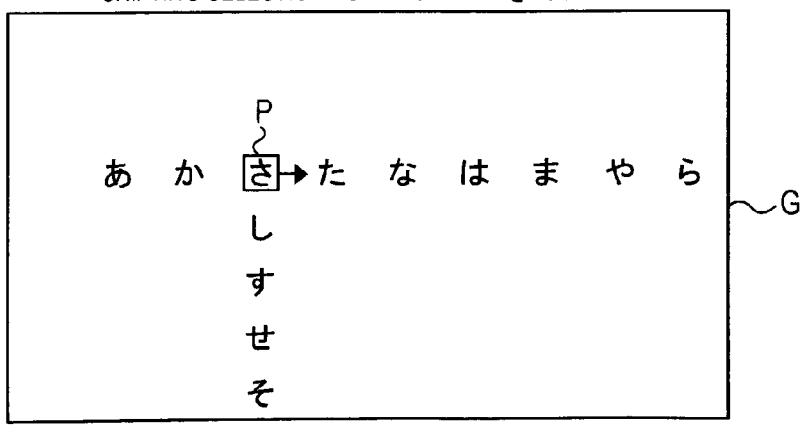

The user may press the right key 176R on the remote controller 170 as represented by an arrow in FIG. 16B. The controller 150 controls the display information generator 161 to display an image with the first row-level kana character " さ "of the " さ "column at the selection position P as shown in FIG. 16C. Further as shown in FIG. 16C, the user may press the right key 176R on the remote controller 170. The controller 150 controls the display information generator 161 to display an image with the first row-level kana character " た "(pronounced ta) of the " た "column placed at the selection position P.

Figure 17A:
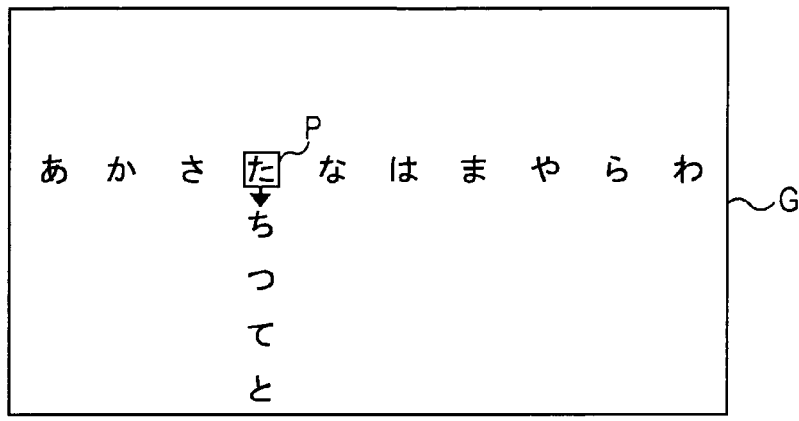
FIGS. 17A-17C illustrate a display screen in which the name " 恒 明 "is input as the tag information.
Figure 17B:
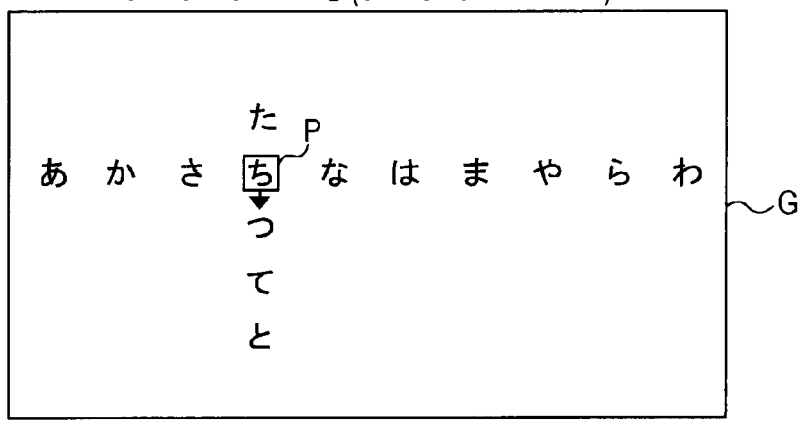
Figure 17C:
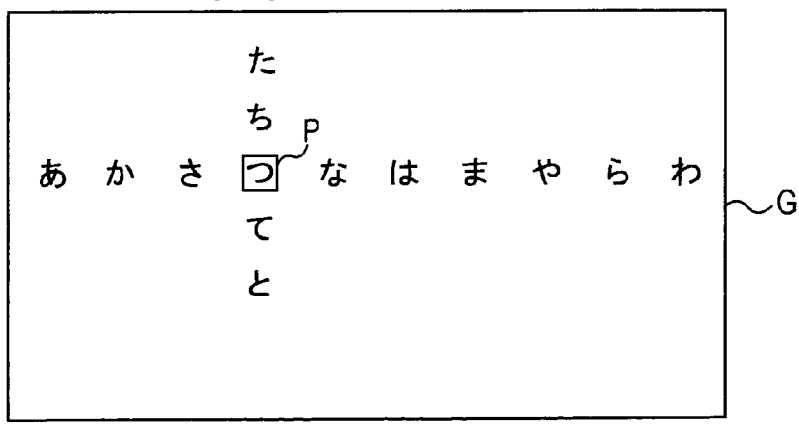

As represented by an arrow in FIG. 17A, the user may press the down key 176D on the remote controller 170. The controller 150 controls the display information generator 161 to display an image with the second row-level kana character " ち "(pronounced ti) of the " た "column as shown in FIG. 17B. As represented by an arrow in FIG. 17B, the user may press the down key 176D. The controller 150 then controls the display information generator 161 to display an image with the third row-level character " つ "(pronounced tu) of the " た "column as shown in FIG. 17C.

The kana character " つ "as the leading character of the child's name " 恒明 ( つねあき if phonetically represented in kana characters (yomigana))" to be input is placed at the selection position P. If the enter key 176K is pressed on the remote controller 170 in the state of FIG. 17C, the kana character " つ "at the selection position P is entered as the leading character of the name to be input. The controller 150 controls the display information generator 161 to display a list of candidates to the second character of the name to be input as shown in FIG. 18A.

Figure 18A:
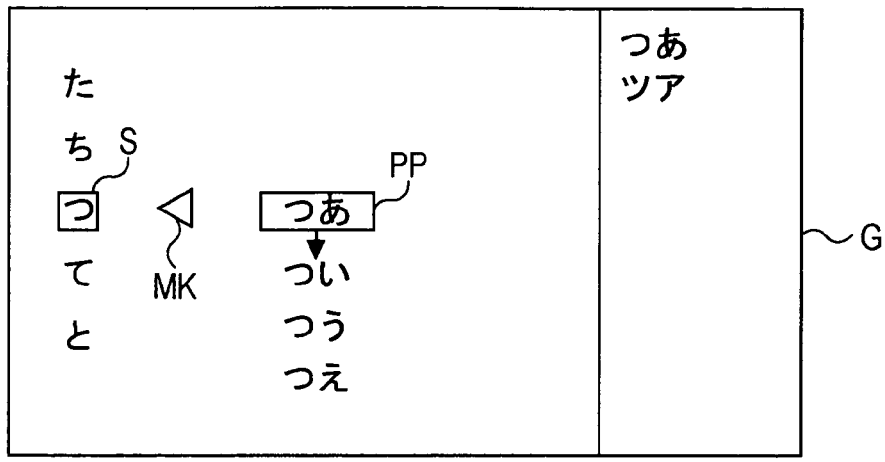
FIGS. 18A-18C illustrate a display screen in which the name " 恒 明 "is input as the tag information.
Figure 18B:
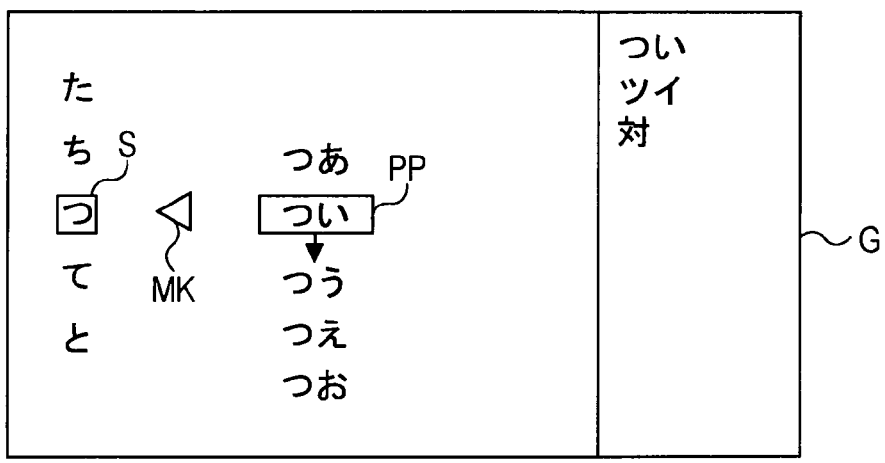
Figure 18C:
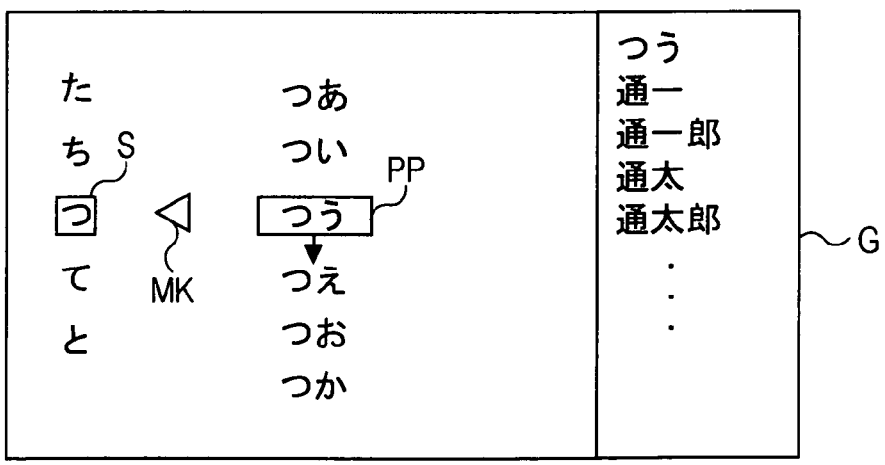

FIGS. 18A-18C illustrate the list of candidates to the second character of the name to be input. As shown in FIGS. 18A-18C, the member kana characters of the selected kana column, in this case, the five characters "た,""ち,""つ,""て," and "と" of the "た"column are displayed and a cursor S is placed on the kana character "つ" to show that the kana character "つ" is a selected character. A selection mark MK is displayed to the right of the selected kana character "つ."

A selection position PP of a candidate is placed to the right of the selection mark MK. Since the leading character is the kana character "つ," a total of two kana characters, namely, a character candidate following the kana character "つ," are displayed. The candidate characters following the kana character "つ" are listed in the Japanese kana syllabary. More specifically, character candidates "つあ""つい,""つう,"... are displayed.

If the user presses the down key 176D of the cursor keys 176 on the remote controller 170 in the state of FIG. 18A, the controller 150 controls the display information generator 161 to change candidates at the selection position PP as shown in FIG. 18B. The display information generator 161 performs this operation by scrolling upward the display of the candidates by one row without changing the position of the selection position PP on the display screen G. As shown in FIG. 18B, the candidate at the selection position PP is changed from "つあ"to"つい."

Similarly, the user presses the down key 176D of the cursor keys 176 on the remote controller 170. The controller 150 controls the display information generator 161 to change candidates at the selection position PP as shown in FIG. 18C. The display information generator 161 performs this operation by scrolling upward the display of the candidates by one row without changing the position of the selection position PP on the display screen G. As shown in FIG. 18C, the candidate at the selection position PP is changed from "つい"to"つう."

Figure 19A:
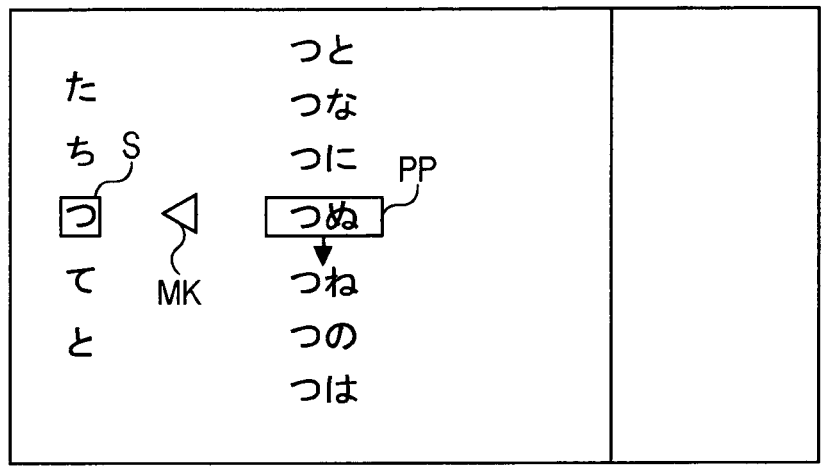
FIGS. 19A and 19B illustrate a display screen in which the name " 恒 明 "is input as the tag information.

The user presses the down key 176D of the cursor keys 176 on the remote controller 170 in this way. The candidate at the selection position PP is successively changed. With the candidate "つね" placed at the selection position PP as shown in FIG. 19A, the user may press the down key 176D of the cursor keys 176 on the remote controller 170. The controller 150 then controls the display information generator 161 to place the candidate "つね" at the selection position PP as shown in FIG. 19B.

Figure 19B:
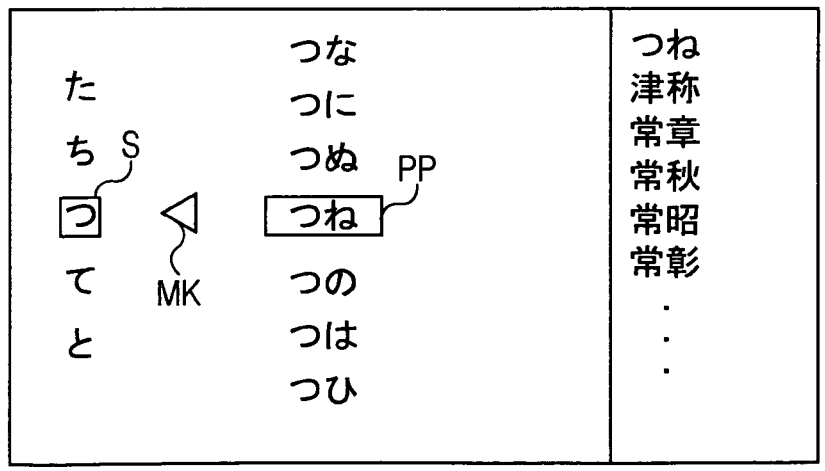
Figure 20A:
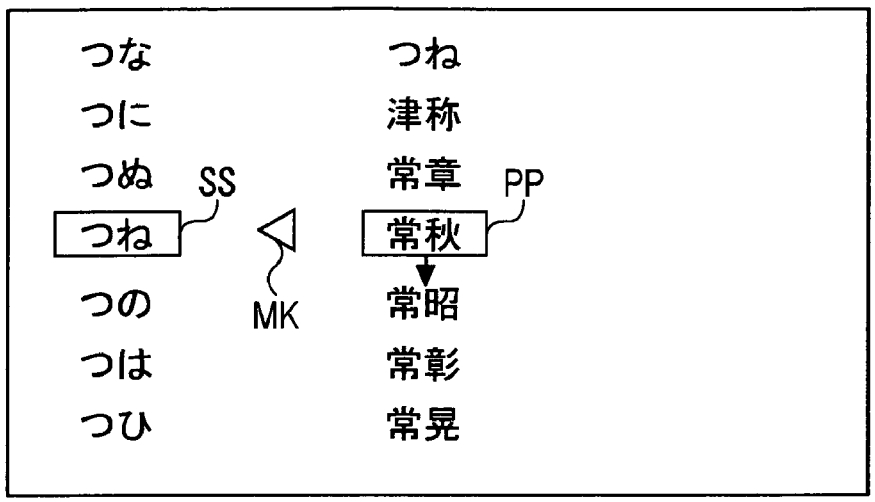
FIGS. 20A and 20B illustrate a display screen in which the name " 恒 明 "is input as the tag information.
Figure 20B:
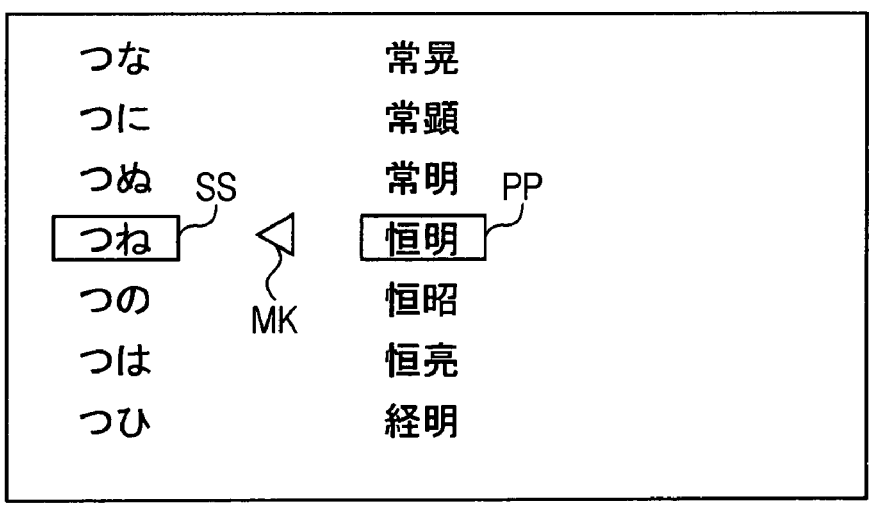

When the user presses the enter key 176K on the remote controller 170 in the state of FIG. 19B, the controller 150 controls the display information generator 161 to reference the persons' name list in the dictionary data memory 162. The controller 150 thus generates and displays display information for displaying a list of target name candidates as illustrated in FIGS. 20A and 20B. FIGS. 20A and 20B illustrate the list of name candidates.

As shown in FIGS. 20A and 20B, a list of name candidates of two leading kana characters of target names to be input is displayed on the left side of the display screen G. Furthermore, a cursor SS is placed on the candidate "つね" to indicate that the candidate "つね" is two leading kana characters of the target name to be input. A selection mark MK is placed to the right of the candidate "つね."

A selection position PP of the name is placed to the right of the selection mark MK. Selectable name candidates are displayed in a column with respect to the selection position PP. As illustrated in FIG. 20A, names having as the two leading characters the characters "つね "(pronounced tune) are listed in the order of the Japanese kana syllabary, e.g., "つね "(pronounced tune), "津祢 "(pronounced tu-ne), "常章 "(pronounced tune-aki), "常秋 "(pronounced tune-aki), "常昭 "(pronounced tune-aki), "常彰 "(pronounced tune-aki), "常晃 "(pronounced tune-aki), . . . . As previously discussed, the display information generator 161 generates the display information as the list of name candidates read from the dictionary data memory 162, and supplies the generated display information to the video synthesizer 126. The list of the name candidates is thus displayed.

Each time the user presses the down key 176D of the cursor keys 176 on the remote controller 170, the controller 150 controls the display information generator 161 to scroll upward the display of the candidates without changing the selection position PP on the display screen G. The controller 150 thus changes the candidate at the selection position PP. As illustrated in FIG. 20A, the candidate at the selection position PP is "常秋".

When the user presses the down key 176D of the cursor keys 176 on the remote controller 170, the controller 150 controls the display information generator 161 to change the candidate with respect to the selection position PP. When a target name "恒明 "(phonetically つねあき(pronounced tuneaki)) to be input is placed at the selection position PP as illustrated in FIG. 20B, the user may press the enter key 176K.

Figure 21:
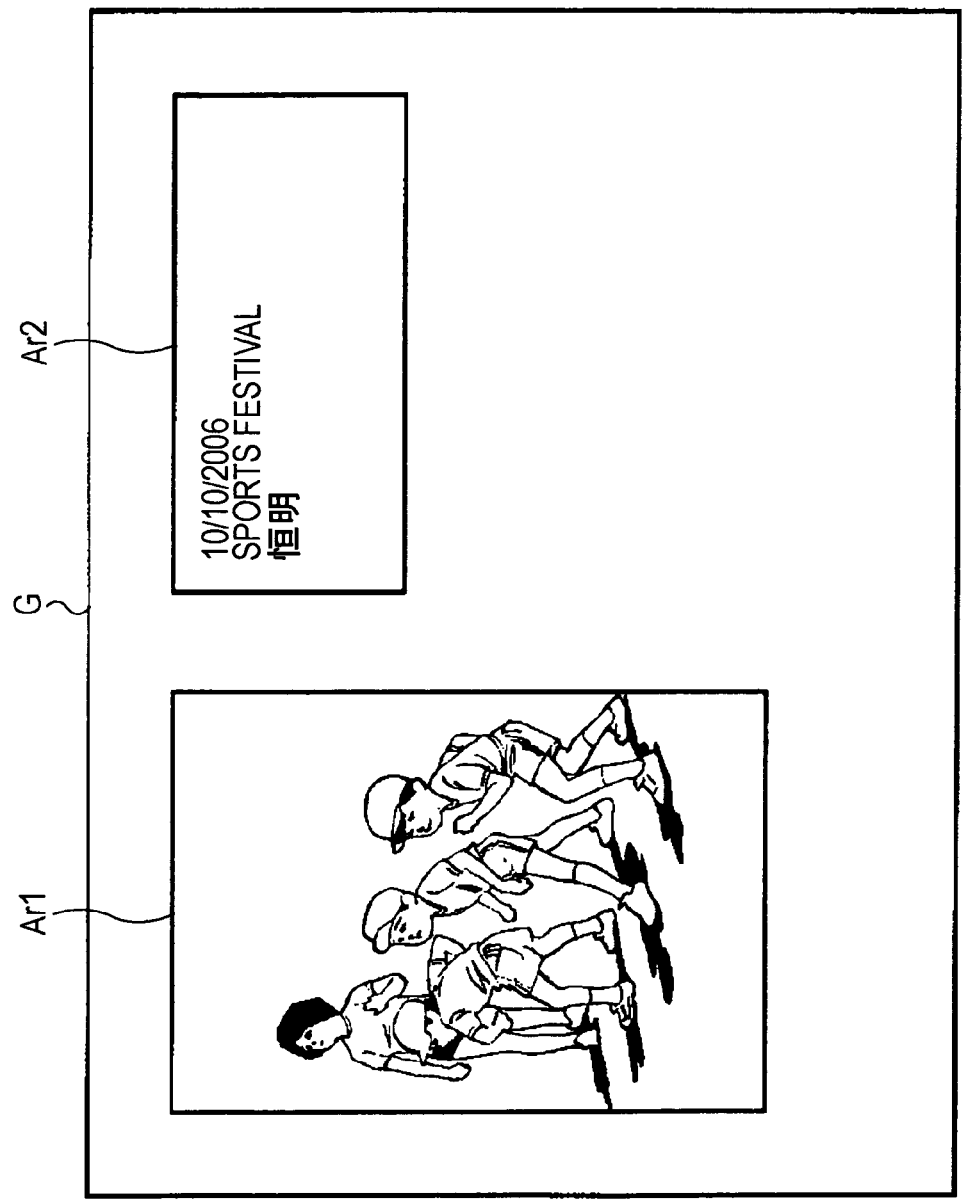
FIG. 21 illustrates an input display screen of the tag information in which the input tag information is displayed.

When the enter key 176K is pressed, the controller 150 enters the name "恒明 "to the selection position PP as a target name to be input, and controls the display information generator 161 to display an input display screen of the tag information. FIG. 21 illustrates the input display screen of the tag information. The input display screen of the tag information of FIG. 21 is substantially identical to the input display screen of FIG. 15.

In the case of the input display screen of FIG. 21, the input name "恒明 "is displayed below "SPORTS FESTIVAL" in the input tag display area Ar2. Furthermore, FIG. 21 shows the input display screen subsequent to the inputting of the name as the tag information. The process display T1 and the tag attribute selection items T11, T12, T13, and T14 are not shown. If the tag information is updated or added, the user may operate a predetermined operation key of the remote controller 170. As previously discussed with reference to FIG. 15, the hard disk recorder is ready to add, update or delete the tag information with the input display screen showing the process display T1 and the tag attribute selection items T11, T12, T13, and T14.

In the state of the input display screen illustrated in FIG. 21, the user can quit inputting the tag information by pressing the enter key 176K on the remote controller 170.

The hard disk recorder of the second embodiment of the present invention allows the user to input a variety of tag information to be added to the content data stored on the hard disk in the HDD 130. The hard disk recorder displays the tag information candidates by inputting one or two leading kana characters of the target tag information instead of all the characters of the target tag information and allows the user to select and input the target tag information.

When the first kana character of the target tag information is input, the Japanese kana syllabary is two-dimensionally arranged in a matrix of rows and columns. A character line of kana characters in the selected kana column and a character line of first row-level characters of the kana columns are displayed with the character lines intersecting each other. Kana characters unlikely to be selected are not shown. The user can input quickly a target character in a simple operation and thus input the tag information quickly.

Modifications of the Second Embodiment

Different kanji characters used as persons' names have occasionally the same reading. According to the second embodiment of the present invention, the name candidates are individually displayed as shown in FIGS. 20A and 20B. It takes time to select a target name. In a modification of the second embodiment, the names represented by the same kanji characters are sorted. In other words, the leading characters of the selection candidates are listed according to written characters rather than the yomigana (phonetic characters).

Figure 22A:
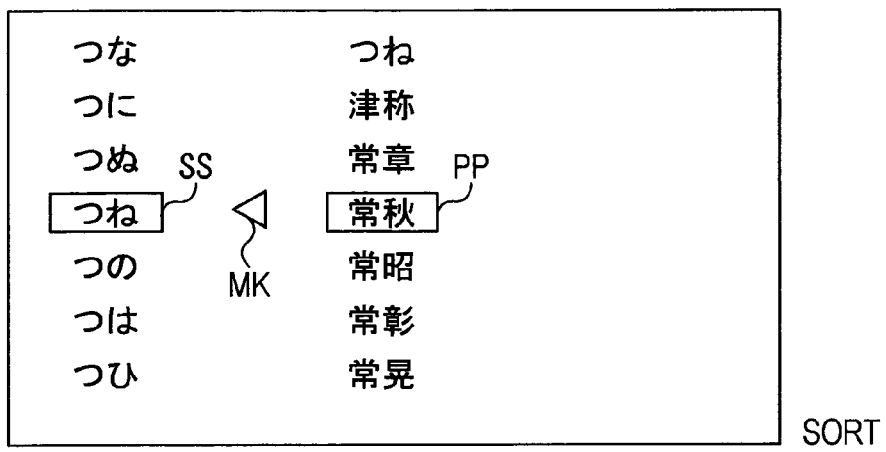
FIGS. 22A-22C illustrate a modification of a second embodiment for sorting characters.
Figure 22B:
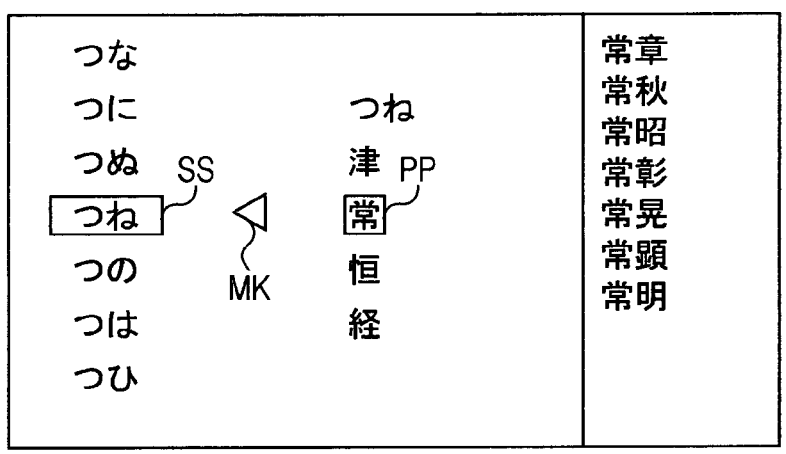

FIGS. 22A-22C and FIG. 23 illustrate the modification of the second embodiment of the present invention that provides sorted characters. As shown in FIG. 22A as well as in FIG. 20A, the leading character of the name to be input and the next character to the leading character are input and the list of the names is displayed. If the user presses a sorting key of the function keys 177, the controller 150 controls the display information generator 161 to sort the names having the same characters from the leading position thereof. As shown in FIG. 22B, a list of sorted characters is displayed.

As illustrated in FIG. 22B, five candidates " つね "(pronounced tune), " 津 "(pronounced tu), " 常 "(pronounced tune), " 恒 "(pronounced tune), and " 経 "(pronounced tune) are displayed. The kanji character " 常 " is placed at the selection position PP. In this case, if the user presses the down key 176D of the cursor keys 176 on the remote controller 170, the controller 150 controls the display information generator 161 to scroll upward the display of the candidates by one row to changes the candidate at the selection position PP.

Figure 22C:
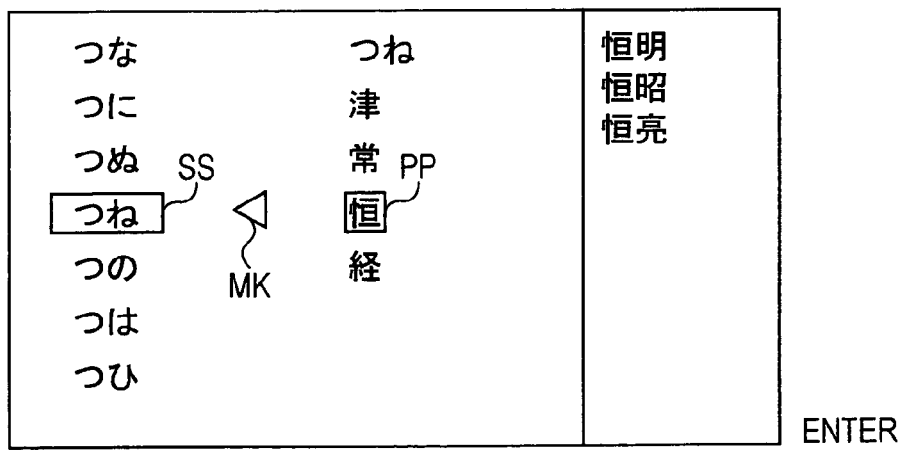

The user may press the enter key 176K on the remote controller 170 with the first kanji character " 恒 "of the target name " 恒 明 "placed on the selection position PP as shown in FIG. 22C. The controller 150 controls the display information generator 161 to generate display information for displaying the a name candidate having a yamigana " つねあき "and containing the kanji character " 恒 "at the leading position thereof. The generated display information is then supplied to the video synthesizer 126 and then displayed on the display screen of the monitor display connected to the hard disk recorder of the second embodiment of the present invention.

Figure 23:
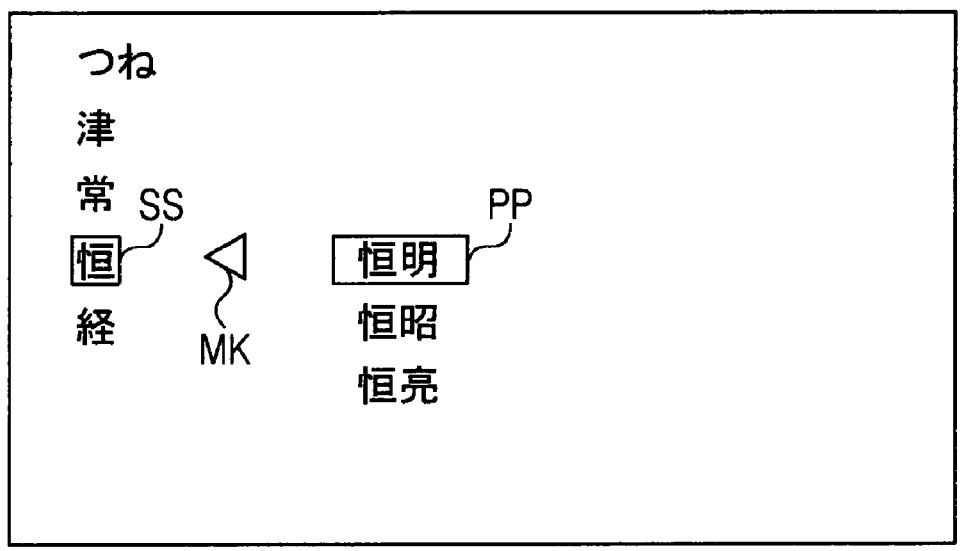
FIG. 23 illustrates a modification of the second embodiment for sorting characters.
Figure 24A:
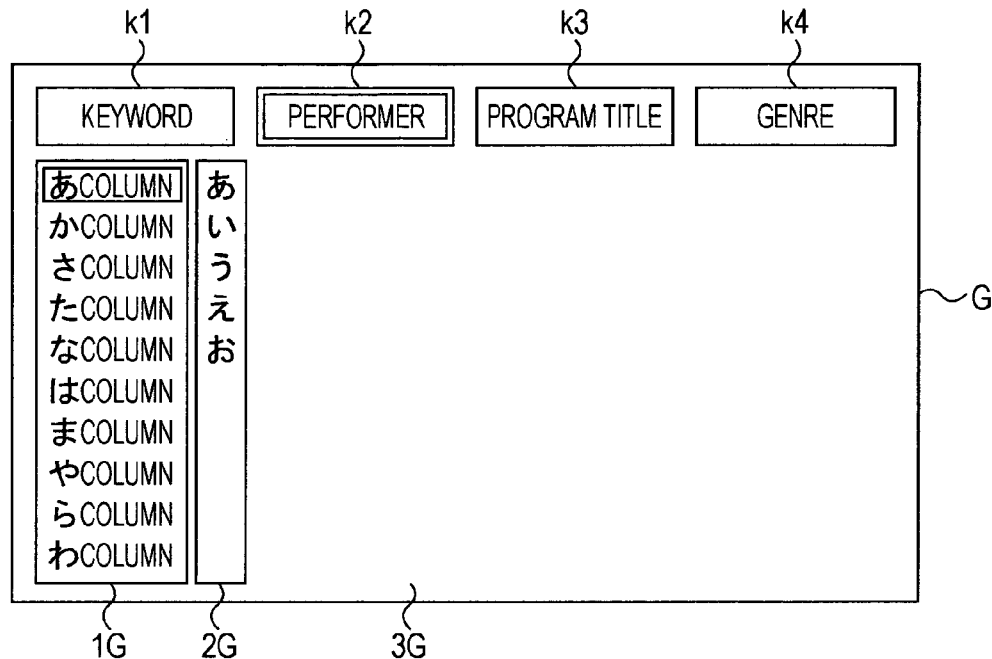
FIGS. 24A and 24B illustrate an example of a keyword search function in the related art.
Figure 24B:
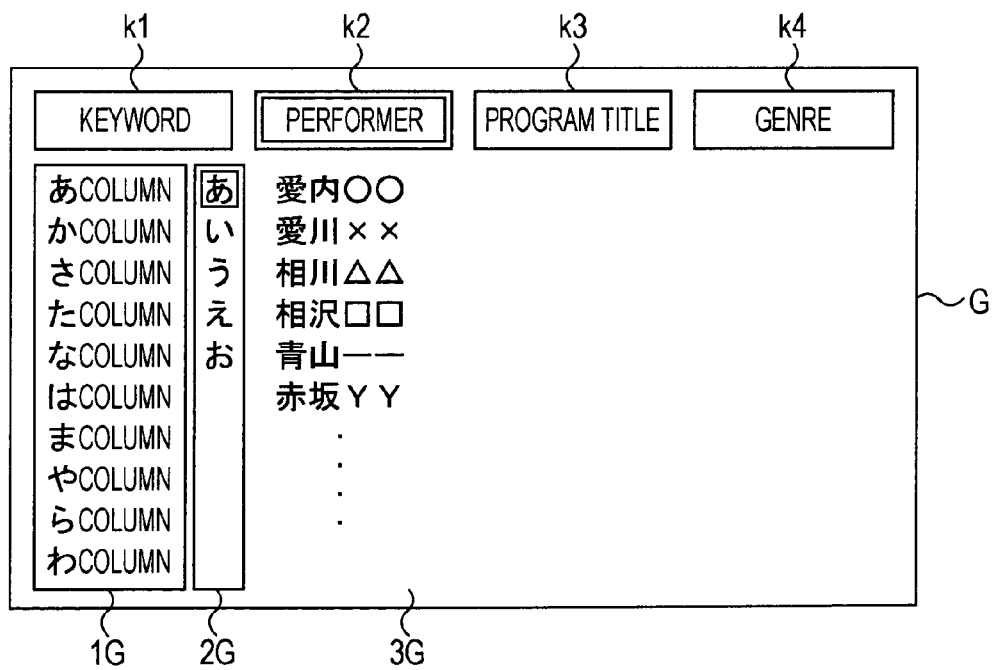
Figure 25:
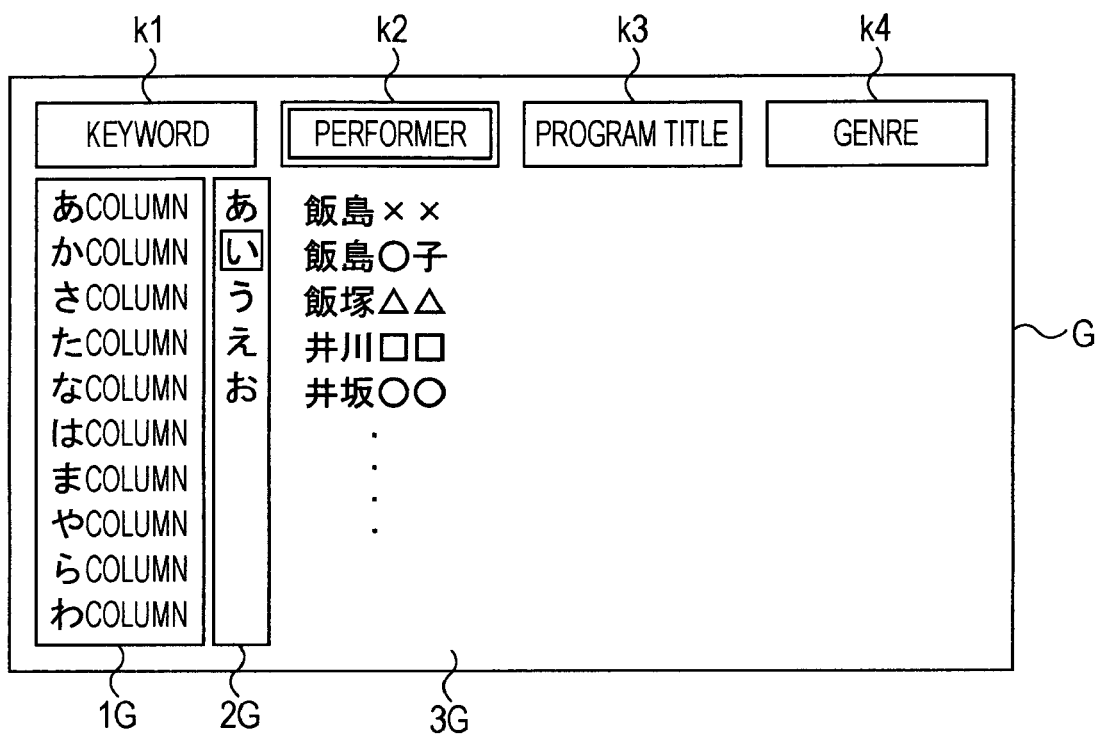
FIG. 25 illustrates the example of the keyword search function in the related art.

As illustrated in FIG. 23, three candidates " 恒明, " " 恒昭, "and " 常亮 "are displayed as having the same yomigana " つねあき "and the kanji character " 恒 "as the first character. The user then presses the enter key 176K on the remote controller 170 with the name " 恒 明 "to be input placed at the selection position PP. In the same manner as illustrated in FIG. 20B, the name " 恒 明 "is entered. As illustrated in FIG. 21, the name " 恒 明 "is input as the tag information to the image displayed in the target image display area Ar1.

The sorting function of sorting the candidates is used to sort the names having the same kanji characters. Only the names having the target character are thus displayed. The target name is efficiently identified and then input in a short period of time.

According to the second embodiment of the present invention, the person's name is input as the tag information. The present invention is not limited to this method. Information to be input may include a person's surname, an event, and a location in addition to the name.

In the above-referenced embodiments, the selection position P, and the selection position PP are fixed to a predetermined position on the display screen. When a target kana character is selected from the Japanese kana syllabary, only the character line of the characters of the selected column and the character line of the first row-level characters of the columns are displayed. The selection position P and the selection position PP (cursor position) may be shifted within the range of the displayed characters only.

With the selection position P and the selection position PP fixed, the user is freed from moving the eyes' view point. The user can thus select the character smoothly. However, if the range of the selection position is not so wide, the selection position P and the selection position PP may be set to be moved.

In the above-referenced embodiments of the present invention, the first-row characters of the kana columns are displayed in a horizontal direction on the screen and the member kana characters of the selected column are displayed in a vertical direction on the screen. Conversely, the first row-level characters of the kana columns are displayed in a vertical direction on the screen and the member kana characters of the selected column are displayed in a horizontal direction on the screen.

In the above-referenced embodiments, the Japanese kana syllabary of two-dimensionally arranged rows and columns has been discussed. The present invention is not limited to the Japanese kana syllabary. A variety of characters two-dimensionally arranged may be handled as an input target.

Alphabets are assigned to numeric keys on cell phones, for example. Similarly, "ABC" arranged at a first column, "DEF" are arranged at a second column, "GHI" are arranged at a third column, "JKL" are arranged at a fourth column, "MNO" are arranged at a fifth column, "PQR" are arranged at a sixth column, "STU" are arranged at a seventh column, "VWX" are arranged at an eighth column, and "YZ" are arranged at a ninth column. Each character is selected in the manner described above.

In the above-referenced embodiments, the present invention is applied to the hard disk recorder. The present invention is not limited to the hard disk recorder. For example, the present invention is applicable to an electronic apparatus, such as a digital still camera or a digital video camera, attaching the tag information to photographed image data, and personal information processing terminals such as cell phones, electronic notebooks, and personal digital assistants (PDAs). The present invention is also applicable to information processing apparatuses inputting and managing information such as a telephone directory or an address book, a variety of electronic apparatuses inputting a keyword (text information), including a searching apparatus connected to the Internet for searching for information, and inputting text information.

The display information generator 161 may be implemented as one element as illustrated in FIG. 1. Alternatively, the display information generator 161 may be implemented as a software program to be executed by the controller 150.

The controller 150 in cooperation with the display information generator 161 embodies a software program for performing the processes discussed with reference to FIGS. 9-11, and the software program is installed on an electronic apparatus. In this way, the present invention is applicable to a variety of electronic apparatuses. The software program may be initially stored on a read-only memory (ROM) of the electronic apparatus. Alternatively, the software program may be distributed in an optical disc such as a compact disc, or a recording medium such as a memory card, and then installed onto the electronic apparatus via the optical disc or the recording medium. Furthermore, the software program may be distributed via a network such as the Internet or a broadcasting network and installed onto a variety of electronic apparatuses.

It should be understood by those skilled in the art that various modifications, combinations, sub-combinations and alterations may occur depending on design requirements and other factors insofar as they are within the scope of the appended claims or the equivalents thereof.

The invention claimed is:

1. An information processing apparatus for searching for a target text information candidate from among text information candidates stored in order to search for and/or input target information, comprising:
   display information generating means having a video synthesizer for generating and displaying display information, the display information including only both a first character line of characters extending in a first direction including a character set to be selected, and a second character line of characters related to the first character line, extending in a second direction and intersecting the first character line, out of a two-dimensional matrix of rows and columns of characters arranged for selection; and
   shift instruction receiving means for receiving a shift instruction to shift from the character set to be selected,
   wherein each character in the two-dimensional matrix comprises a Japanese Kana character in the Japanese Kana syllabary of a two-dimensional matrix of rows and columns of Kana characters.

2. The information processing apparatus according to claim 1, wherein when the change instruction input is received by the shift instruction receiving means, the display information generating means generates the display text information by changing a display position of the characters without changing a selection position on a display screen so that the character set to be selected at the selection position is changed.

3. The information processing apparatus according to claim 1 or 2, further comprising:
   entry receiving means for receiving an entry instruction input for entering a character set to be selected as a leading character of the text information candidate to be searched; and
   information candidate generating means for generating and displaying display information for displaying the text information candidate containing as a leading character the character selected and entered when the entry receiving means receives the entry instruction input.

4. The information processing apparatus according to claim 3, further comprising:
   sort receiving means for receiving a sorting instruction input to sort text information candidates having the common feature from among the text information candidates displayed in response to the display information generated by the information candidate generating means;
   sorting information generating means for generating and displaying display information, the display information for sorting the text information candidates having the common feature and displaying sorting results when the sort receiving means receives the sorting instruction input; and
   selection receiving means for receiving a selection instruction input to select a target candidate from among the text information candidates displayed in response to the display information generated by the sorting information generating means.

5. A method for searching for a target text information candidate from among text information candidates stored in order to search for and/or input target information, comprising:
   generating and displaying display information, the display information including only both a first character line of characters extending in a first direction including a character set to be selected, and a second character line of characters related to the first character line, extending in a second direction and intersecting the first character line, out of a two-dimensional matrix of rows and columns of characters arranged for selection; and
   receiving a shift instruction to shift from the character set to be selected,
   wherein each character in the two-dimensional matrix comprises a Japanese Kana character in the Japanese Kana syllabary of a two-dimensional matrix of rows and columns of Kana characters.

6. The method according to claim 5, wherein in response to the reception of the change instruction input, the display text information is generated by changing a display position of the characters without changing a selection position on a display screen so that the character set to be selected at the selection position is changed.

7. The method according to claim 5 or 6, further comprising:
   receiving an entry instruction input for entering a character set to be selected as a leading character of the text information candidate to be searched; and
   generating and displaying display information for displaying the text information candidate containing as a leading character the character selected and entered in response to the reception of the entry instruction input.

8. The method according to claim 7, further comprising:
   receiving a sorting instruction input to sort text information candidates having the common feature from among the text information candidates displayed in response to the generated display information;
   generating and displaying display information, the display information for sorting the text information candidates having the common feature and displaying sorting results in response to the reception of the sorting instruction input; and
   receiving a selection instruction input to select a target candidate from among the text information candidates displayed in response to the generated display information.

9. A non-transitory computer readable recording medium having stored thereon program for causing a computer to execute a method for searching for a target text information candidate from among text information candidates stored in order to search for and/or input target information, comprising:
   generating and displaying display information, the display information including only both a first character line of characters extending in a first direction including a character set to be selected, and a second character line of characters related to the first character line, extending in a second direction and intersecting the first character line, out of a two-dimensional matrix of rows and columns of characters arranged for selection; and
   receiving a shift instruction to shift from the character set to be selected, wherein each character in the two-dimensional matrix comprises a Japanese Kana character in the Japanese Kana syllabary of a two-dimensional matrix of rows and columns of Kana characters.

10. The medium according to claim 9, wherein in response to the reception of the change instruction input, the display text information is generated by changing a display position of the characters without changing a selection position on a display screen so that the character set to be selected at the selection position is changed.

11. The medium according to claim 9 or 10, further comprising:
   receiving an entry instruction input for entering a character set to be selected as a leading character of the text information candidate to be searched; and
   generating and displaying display information for displaying the text information candidate containing as a leading character the character selected and entered in response to the reception of the entry instruction input.

12. The medium according to claim 11, further comprising:
   receiving a sorting instruction input to sort text information candidates having the common feature from among the text information candidates displayed in response to the generated display information;
   generating and displaying display information, the display information for sorting the text information candidates having the common feature and displaying sorting results in response to the reception of the sorting instruction input; and
   receiving a selection instruction input to select a target candidate from among the text information candidates displayed in response to the generated display information.

13. An information processing apparatus for searching for a target text information candidate from among text information candidates stored in order to search for and/or input target information, comprising:
   a display information generating unit having a video synthesizer and configured to generate and display display information, the display information including only both a first character line of characters extending in a first direction including a character set to be selected, and a second character line of characters related to the first character line, extending in a second direction and intersecting the first character line, out of a two-dimensional matrix of rows and columns of characters arranged for selection; and
   a shift instruction receiving unit configured to receive a shift instruction input to shift from the character set to be selected,
   wherein each character in the two-dimensional matrix comprises a Japanese Kana character in the Japanese Kana syllabary of a two-dimensional matrix of rows and columns of Kana characters.

* * * * *